(12) United States Patent
Koishi et al.

(10) Patent No.: US 7,003,247 B2
(45) Date of Patent: Feb. 21, 2006

(54) ELECTROPHOTOGRAPHIC PHOTOSENSITIVE DRUM, PROCESS CARTRIDGE, AND ELECTROPHOTOGRAPHIC IMAGE FORMING APPARATUS

(75) Inventors: Isao Koishi, Susono (JP); Atsushi Numagami, Hadano (JP); Takahito Ueno, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/960,117

(22) Filed: Oct. 8, 2004

(65) Prior Publication Data

US 2005/0220490 A1    Oct. 6, 2005

(30) Foreign Application Priority Data

Mar. 30, 2004  (JP)  ............................. 2004-099503

(51) Int. Cl.
*G03G 15/00* (2006.01)

(52) U.S. Cl. ..................... 399/167; 399/111; 399/116; 399/117

(58) Field of Classification Search ................ 399/110, 399/111, 112, 117, 167
See application file for complete search history.

(56) References Cited

U.S. PATENT DOCUMENTS

| | | | |
|---|---|---|---|
| 5,500,714 A | 3/1996 | Yashiro et al. | 355/200 |
| 5,768,658 A | 6/1998 | Watanabe et al. | 399/111 |
| 5,920,753 A | 7/1999 | Sasaki et al. | 399/111 |
| 5,937,242 A | 8/1999 | Yokoyama et al. | 399/114 |
| 5,966,568 A | 10/1999 | Numagami et al. | 399/111 |
| 6,006,058 A | 12/1999 | Watanabe et al. | 399/167 |
| 6,016,413 A | 1/2000 | Yokoyama et al. | 399/113 |
| 6,029,032 A | 2/2000 | Watanabe et al. | 399/111 |
| 6,097,908 A | 8/2000 | Uchiyama et al. | 399/111 |
| 6,097,909 A | 8/2000 | Watanabe et al. | 399/111 |
| 6,118,960 A | 9/2000 | Nakagawa et al. | 399/111 |
| 6,167,219 A * | 12/2000 | Miyamoto et al. | 399/90 |
| 6,169,866 B1 | 1/2001 | Watanabe et al. | 399/111 |
| 6,246,849 B1 | 6/2001 | Yokoyama et al. | 399/117 |
| 6,272,299 B1 | 8/2001 | Numagami et al. | 399/111 |
| 6,289,189 B1 | 9/2001 | Numagami et al. | 399/111 |
| 6,330,409 B1 | 12/2001 | Watanabe et al. | 399/111 |
| 6,442,359 B1 | 8/2002 | Numagami et al. | 399/111 |
| 6,463,233 B1 | 10/2002 | Kojima et al. | 399/111 |
| 6,577,831 B1 | 6/2003 | Kojima et al. | 399/111 |

(Continued)

FOREIGN PATENT DOCUMENTS

JP    2000-112200    4/2000

*Primary Examiner*—David M. Gray
*Assistant Examiner*—Laura K. Roth
(74) *Attorney, Agent, or Firm*—Fitzpatrick, Cella, Harper & Scinto

(57) ABSTRACT

An electrophotographic photosensitive drum includes a non-circular twisted projection, provided at one longitudinal end of the drum, having a cross-section with a plurality of corner portions, and being engageable with a non-circular twisted hole located at a central portion of a driving rotatable member of a main assembly of an image forming apparatus and has a cross-section with a plurality of corner portions; and a second electroconductive member contactable with a first electroconductive member electrically connected with the main assembly of the image forming apparatus. The first electroconductive member is disposed in the hole to ground the drum. The second electroconductive member is provided on the projection and electrically connected with the drum. The contact position between the first and second electroconductive members moves in interrelation with the projection being retracted toward the hole by rotation of the driving rotatable member when the projection is engaged with the hole.

2 Claims, 9 Drawing Sheets

U.S. PATENT DOCUMENTS

| | | |
|---|---|---|
| 6,608,980 B1 | 8/2003 | Murayama et al. .......... 399/111 |
| 6,714,752 B1 | 3/2004 | Ueno et al. ................. 399/117 |
| 6,829,455 B1 | 12/2004 | Yasumoto et al. .......... 399/167 |
| 6,901,229 B1 * | 5/2005 | Nishiuwatoko et al. ..... 399/167 |
| 2002/0085854 A1 | 7/2002 | Numagami et al. ........... 399/90 |
| 2004/0126131 A1 | 7/2004 | Numagami et al. ......... 399/109 |

* cited by examiner

ELECTROPHOTOGRAPHIC PHOTOSENSITIVE DRUM, PROCESS CARTRIDGE, AND ELECTROPHOTOGRAPHIC IMAGE FORMING APPARATUS

FIELD OF THE INVENTION AND RELATED ART

The present invention relates to an electrophotographic photosensitive drum, a process cartridge comprising an electrophotographic photosensitive drum, and an electrophotographic image forming apparatus.

Here, an electrophotographic image forming apparatus means an apparatus for forming an image on recording medium with the use of one of the electrophotographic image forming methods. The examples of an electrophotographic image forming apparatus include an electrophotographic copying machine, an electrophotographic printer (for example, a laser printer, an LED printer, etc.), a facsimile apparatus, a word processor, etc.

A process cartridge is a cartridge which is removably mountable in the main assembly of an image forming apparatus, and in which a minimum of one among a charging means, a developing means, and a cleaning means, as a processing means, and an electrophotographic photosensitive member, are integrally placed so that they can be removably mountable in the main assembly of an image forming apparatus.

A photosensitive drum unit means an electrophotographic photosensitive member in the form of a drum, employed by the main assembly of an electrophotographic image forming apparatus.

An electrophotographic image forming apparatus such as a copying machine, a laser printer, a facsimile machine, etc., forms an electrostatic latent image by selectively exposing numerous points of the peripheral surface of the electrophotographic photosensitive drum uniformly charged by a charging apparatus. Then, it develops the electrostatic latent image into a visible image (image formed of toner) by adhering toner to the electrostatic latent image, with the use of the developing apparatus, and yields a copy of an intended image by transferring the toner image onto a recording medium such as a sheet of paper. After the transfer of the toner image, it removes the toner remaining on the peripheral surface of the electrophotographic photosensitive drum, with the use of the cleaning apparatus, preparing the photosensitive drum for the following image formation operation.

In the field of an electrophotographic image forming apparatus employing an electrophotographic image formation process, it has been a common practice to employ a process cartridge system, in which an electrophotographic photosensitive drum, and a single or plurality of processing means, such as a charging apparatus, a developing apparatus, a cleaning apparatus, etc., which act on the electrophotographic photosensitive drum, are integrally placed in a cartridge removably mountable in the main assembly of an image forming apparatus. According to this process cartridge system, apparatus maintenance can be carried out by a user by himself, without the need for relying on service personnel, drastically improving an image forming apparatus in operational efficiency. Thus, a process cartridge system has been widely used in the field of an image forming apparatus.

An electrophotographic photosensitive drum is structured to allow residual electric charge to escape from the electrophotographic photosensitive drum to the main assembly of the image forming apparatus. More specifically, the electrophotographic photosensitive drum comprises a drum cylinder formed of electrically conductive substance, and a pair of flanges having a shaft portion by which the electrophotographic photosensitive drum is supported by the frame of a process cartridge or the main assembly of the image forming apparatus. The flanges are attached to the lengthwise ends of the drum cylinder by being pressed into the openings of the lengthwise ends of the drum cylinder. One of the flanges is provided with an electrically conductive member, which is located at the center of the flange. This conductive member is provided with a projection, which contacts the internal surface of the drum cylinder, and a flat portion by which the conductive member of the flange contacts the conductive member on the main assembly side of the image forming apparatus. According to the prior art, the conductive member on the main assembly side is kept in contact with the conductive member of the flange by utilizing the resiliency of a spring or the like, in order to keep the electrophotographic sensitive drum electrically connected to the apparatus main assembly (Japanese Laid-open Patent Application 2000-112200).

SUMMARY OF THE INVENTION

The primary object of the present invention is to provide an electrophotographic photosensitive drum capable of reliably establishing electrical connection between it and the main assembly of an electrophotographic image forming apparatus, a process cartridge comprising said electrophotographic photosensitive drum, and an electrophotographic image forming apparatus compatible with said electrophotographic photosensitive drum and process cartridge.

Another object of the present invention is to provide an electrophotographic photosensitive drum capable of wiping its electrically conductive member in order to be reliably grounded, a process cartridge comprising said electrophotographic photosensitive drum, and an electrophotographic image forming apparatus compatible with said electrophotographic photosensitive drum and process cartridge.

Another object of the present invention is to provide an electrophotographic photosensitive drum capable of rotating the first and second electrically conductive members together in order to prevent the conductive members from being frictionally worn, a process cartridge comprising said electrophotographic photosensitive drum, and an electrophotographic image forming apparatus compatible with said electrophotographic photosensitive drum and process cartridge.

According to an aspect of the present invention, there is provided an electrophotographic photosensitive drum usable with an electrophotographic image forming apparatus, comprising a non-circular twisted projection having a cross-section with a plurality of corner portions, the non-circular twisted projection being provided at one longitudinal end of the electrophotographic photosensitive drum, and being engageable with a non-circular twisted hole having a section with a plurality of corner portions, the non-circular twisted hole being disposed at a central portion of a driving rotatable member of a main assembly of the image forming apparatus; and a second electroconductive member contactable with a first electroconductive member electrically connected with a main assembly of the image forming apparatus, the first electroconductive member being disposed in the hole to ground the electrophotographic photosensitive drum, the said second electroconductive member being provided on the projection and being electrically connected with the electrophotographic photosensitive drum, wherein a contact position between the second electroconductive member and the first electroconductive member moves in interrelation with the projection being moved toward the hole by rotation of the driving rotatable member when the projection is engaged with the non-circular twisted hole of the driving rotatable member.

According to another aspect of the present invention, there is provided an electrophotographic photosensitive drum usable with an electrophotographic image forming apparatus, comprising a non-circular twisted projection having a cross-section with a plurality of corner portions, the non-circular twisted projection being provided at one longitudinal end of the electrophotographic photosensitive drum, and being engageable with a non-circular twisted hole having a section with a plurality of corner portions, the non-circular twisted hole being disposed at a central portion of a driving rotatable member of a main assembly of the image forming apparatus; a second electroconductive member contactable with a first electroconductive member electrically connected with a main assembly of the image forming apparatus, the first electroconductive member being disposed in the hole to ground the electrophotographic photosensitive drum, the second electroconductive member being provided on the projection and being electrically connected with the electrophotographic photosensitive drum, wherein while the projection is in engagement with the hole and is being rotated, the second electroconductive member and the first electroconductive member are integrally rotated while being in contact with each other.

According to a further aspect of the present invention, there is provided a process cartridge detachably mountable to an electrophotographic image forming apparatus, the process cartridge comprising an electrophotographic photosensitive drum; a non-circular twisted projection having a cross-section with a plurality of corner portions, the non-circular twisted projection being provided at one longitudinal end of the electrophotographic photosensitive drum, and being engageable with a non-circular twisted hole having a section with a plurality of corner portions, the non-circular twisted hole being disposed at a central portion of a driving rotatable member of a main assembly of the image forming apparatus; and a second electroconductive member contactable with a first electroconductive member electrically connected with the main assembly of the image forming apparatus, the first electroconductive member being disposed in the hole to ground the electrophotographic photosensitive drum, the second electroconductive member being provided on the projection and being electrically connected with the electrophotographic photosensitive drum, wherein a contact position between the second electroconductive member and the first electroconductive member moves in interrelation with the projection being moved toward the hole by rotation of the driving rotatable member when the projection is engaged with the hole of the driving rotatable member.

According to a further aspect of the present invention, there is provided a process cartridge detachably mountable to an electrophotographic image forming apparatus, the process cartridge comprising an electrophotographic photosensitive drum; a non-circular twisted projection having a cross-section with a plurality of corner portions, the non-circular twisted projection being provided at one longitudinal end of the electrophotographic photosensitive drum, and being engageable with a non-circular twisted hole having a section with a plurality of corner portions, the non-circular twisted hole being disposed at a central portion of a driving rotatable member of a main assembly of the image forming apparatus; and a second electroconductive member contactable with a first electroconductive member electrically connected with the main assembly of the image forming apparatus, the first electroconductive member being disposed in the hole to ground the electrophotographic photosensitive drum, the second electroconductive member being provided on the projection and being electrically connected with the electrophotographic photosensitive drum, wherein while the projection is in engagement with the hole and is being rotated, the second electroconductive member and the first electroconductive member are integrally rotated while being in contact with each other.

According to a further aspect of the present invention, there is provided a electrophotographic image forming apparatus to which a process cartridge is detachably mountable, comprising (i) rotational drive member;

(ii) a non-circular twisted hole having a cross-section with a plurality of corner portions, the non-circular twisted hole being disposed at a central portion of a driving rotatable member of a main assembly of the apparatus;

(iii) a first electrophotographic member electrically connected with the main assembly of the image forming apparatus;

(iv) a process cartridge demountably mounted to a cartridge mounting portion, the process cartridge including, an electrophotographic photosensitive drum, a non-circular twisted projection having a cross-section with a plurality of corner portions, the non-circular twisted projection being provided at one longitudinal end of the electrophotographic photosensitive drum, and being engageable with the non-circular twisted hole, and a second electroconductive member contactable with a first electroconductive member electrically connected with a main assembly of the image forming apparatus to electrically ground the electrophotographic photosensitive drum, the second electroconductive member being provided on the projection and being electrically connected with the electrophotographic photosensitive drum, wherein a contact position between the second electroconductive member and the first electroconductive member moves in interrelation with the projection being moved toward the hole by rotation of the driving rotatable member when the projection is engaged with the hole of the driving rotatable member.

According to a further aspect of the present invention, there is provided an electrophotographic image forming apparatus to which a process cartridge is detachably mountable, comprising (i) rotational drive member;

(ii) a non-circular twisted hole having a cross-section with a plurality of corner portions, the non-circular twisted projection being disposed at a central portion of a driving rotatable member of a main assembly of the apparatus;

(iii) a first electroconductive member electrically connected the main assembly of said image forming apparatus, the first electroconductive member being disposed in the hole;

(iv) a process cartridge demountably mounted to a cartridge mounting portion, the process cartridge including, an electrophotographic photosensitive drum, a non-circular twisted projection having a cross-section with a plurality of corner portions, the non-circular twisted projection being provided at one longitudinal end of the electrophotographic photosensitive drum, and being engageable with the non-circular twisted hole, and a second electroconductive member contactable with a first electroconductive member electrically connected with the main assembly of the image forming apparatus to electrically ground the electrophotographic photosensitive drum, the second electroconductive member being provided on the projection and being electrically connected with the electrophotographic photosensitive drum, wherein while the projection is in engagement with the hole and is being rotated, the second electroconductive member and the first electroconductive member are integrally rotated while being in contact with each other.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Hereinafter, the preferred embodiments of the present invention will be described with reference to the appended drawings.

[Embodiment 1]

(1) General Structure of Image Forming Apparatus

Figure 1:
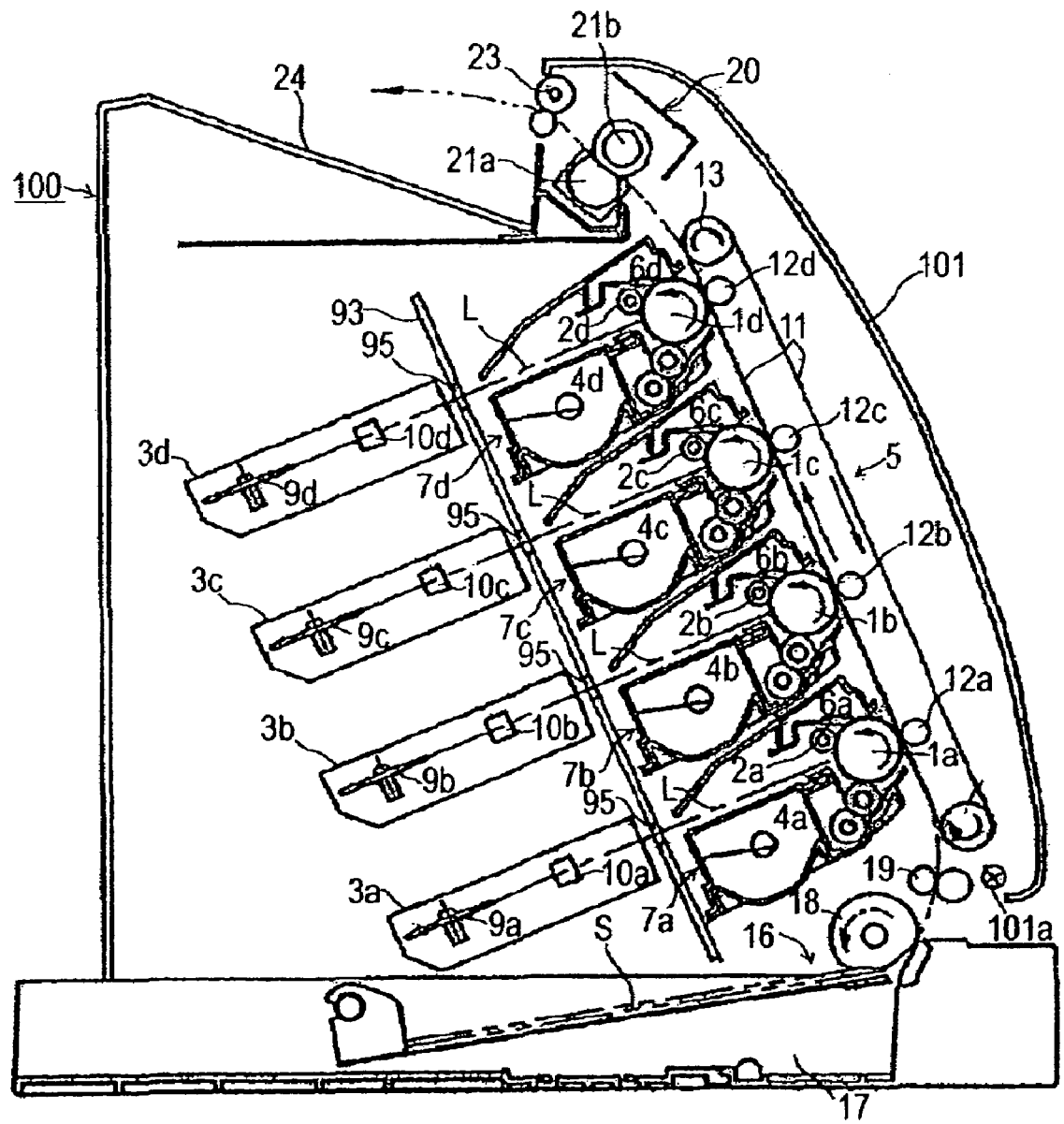
FIG. 1 is a schematic sectional view of the multicolor image forming apparatus in one of the preferred embodiments of the present invention.

FIG. 1 is a vertical sectional view of the multicolor image forming apparatus in the preferred embodiment of the present invention, showing the general structure thereof. This multicolor image forming apparatus is a full-color laser beam printer which uses an electrophotographic process of a transfer type, and employs a plurality of process cartridges removably mountable in its cartridge compartment. It has a process cartridge compartment in which a plurality of process cartridges are virtually vertically stacked in parallel.

Designated by a referential number 100 is the main assembly of the image forming apparatus (which hereinafter will be referred to simply as apparatus main assembly), and designated by a referential number 101 is a front cover of the apparatus (which hereinafter will be referred to simply as front cover). This front cover 101 is hinged to the apparatus main assembly 100, being enabled to be opened or closed by being rotated about the hinge shaft 101a located at the bottom edge of the front cover 101. In FIG. 1, the front cover 101 is closed against the apparatus main assembly 100, and in FIG. 2, the front cover 101 has been opened toward an operator, exposing the opening 91 through which process cartridges are inserted into the apparatus main assembly 100.

Designated by referential numbers 7a, 7b, 7c, and 7d are four process cartridges (which hereinafter will be referred to simply as cartridges), that is, first to fourth cartridges for forming toner images of magenta, cyan, yellow, and black colors, which correspond to the color components into which the optical image of an intended full-color image is separated. These cartridges 7 are stacked in parallel in the direction slightly tilted from the true vertical direction, in the cartridge compartment of the apparatus main assembly 100, being stacked in the listed order, with the cartridge 7a positioned at the bottom.

Each cartridge 7(a–d) has an electrophotographic photosensitive member, as an image bearing member 1(a–d), in the form of a drum (which hereinafter will be referred to as photosensitive drum). It also has such electrophotographic processing devices as a charging apparatus (charging means) 2(a–d) for uniformly charging the peripheral surface of the photosensitive drum 1, a developing apparatus (developing means) 4 for developing the electrostatic latent image formed on the peripheral surface of the photosensitive drum 1 into a toner image (image formed of toner) by adhering toner to the electrostatic latent image, a cleaning apparatus (cleaning means) 6(a–d) for removing the toner remaining on the peripheral surface of the photosensitive drum 1 after the transfer of the toner image onto a transfer medium (recording medium), etc.

The developers stored in the developing apparatuses 4(a–d) of the first to fourth cartridges 7(a–d) are magenta, cyan, yellow, and black toners, respectively.

Designated by reference characters 3a, 3b, 3c, and 3d are four scanner units which correspond to the four cartridges 7 one for one. The scanner unit is an exposing means for forming an electrostatic latent image on the peripheral surface of the photosensitive drum 1, by projecting a beam of laser light (image forming light) L onto the uniformly charged peripheral surface of the photosensitive drum 1. More specifically, the beam of laser light L outputted from the laser diode (unshown) while being modulated with image formation data is reflected (deflected) by the polygon mirror 9(a–d) being rotated at a high speed by the scanner motor (unshown). The reflected beam of laser light L is sent through the image forming lens 10(a–d), being thereby focused on the uniformly charged peripheral surface of the photosensitive drum 1. As a result, numerous points of the uniformly charged peripheral surface of the photosensitive drum 1 are selectively exposed, forming an electrostatic image on the peripheral surface of the photosensitive drum 1.

Designated by a reference number 93 is a partitioning wall in the apparatus main assembly 100. It partitions the cartridge compartment, in which the four cartridges 7(a–d)

are mounted, from the scanner unit compartment, in which the four scanner units 3(a–d) are located. The beam of laser light L outputted from each of the scanner units 3(a–d) enters the corresponding cartridge 7 through the corresponding window 95, that is, one of the windows with which the partitioning wall 93 is provided, and scans the peripheral surface of the corresponding photosensitive drum 1, selectively exposing the numerous points of the peripheral surface of the photosensitive drum 1.

Figure 2:
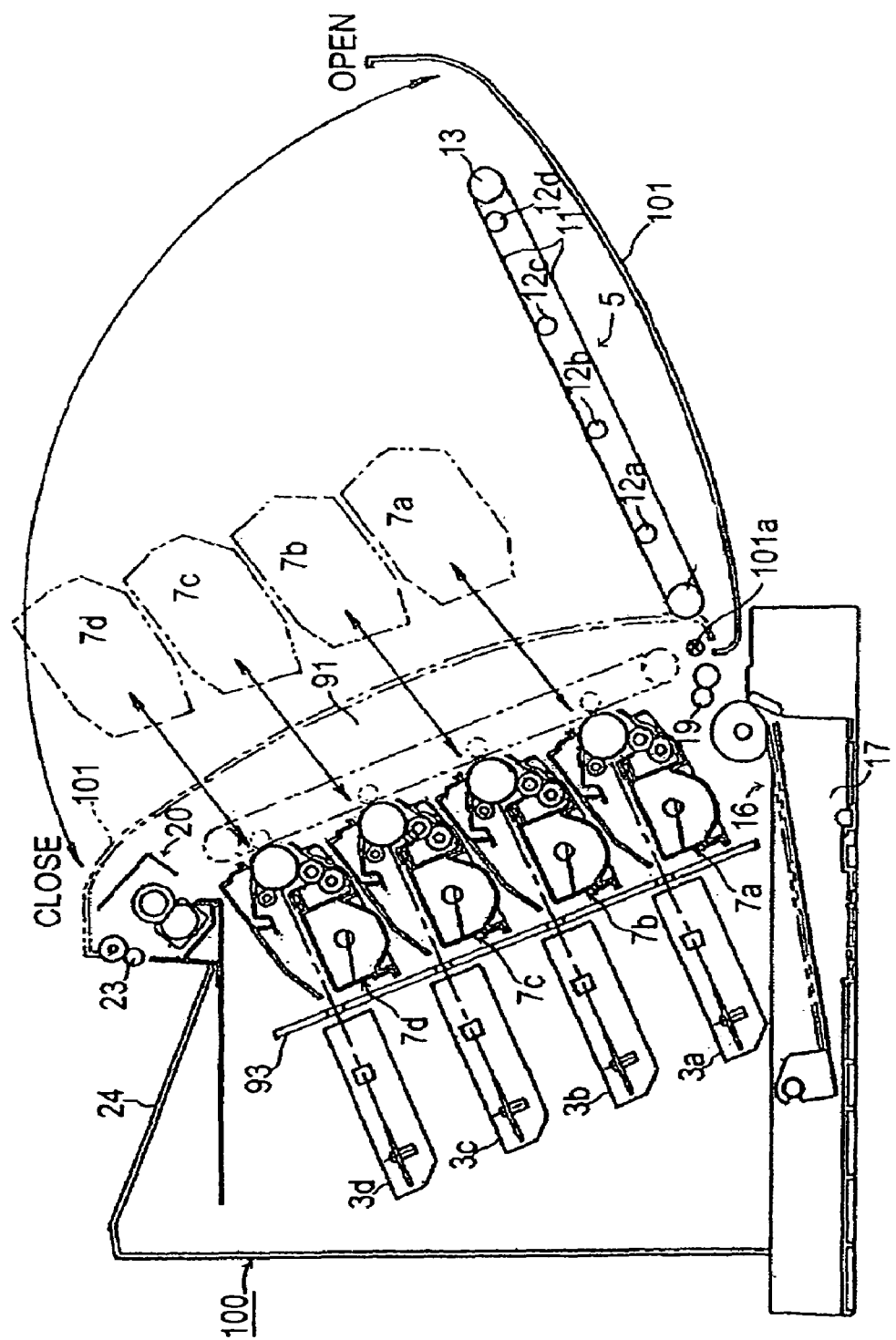
FIG. 2 is a schematic sectional view of the image forming apparatus in the preferred embodiment of the present invention, the front cover of which has been opened to expose the opening through which process cartridges are inserted.

Designated by a referential number 5 is an electrostatic transferring apparatus (electrostatic transferring means), which is attached to the inward side of the front cover 101. Thus, the front cover 101 is opened or closed, along with this electrostatic transferring apparatus 5, against the apparatus main assembly 100 (FIG. 2). The electrostatic transferring apparatus 5 is provided with an electrostatic transfer belt 11, which is circularly driven in contact with all of the photosensitive drum 1 of the first to fourth cartridges 7 after the front cover 101 is closed against the apparatus main assembly 100. Designated by referential numbers 12a, 12b, 12c, and 12d are four transfer rollers, which are placed within the loop formed by the electrostatic transfer belt 11, being positioned so that the electrostatic transfer belt 11 remains pinched between the photosensitive drums 1 of the first to fourth cartridges 7(a–d), and electrostatic transfer belt 11.

Designated by a reference number 16 is a transfer medium conveying portion located in the bottom portion of the apparatus main assembly 100. It is a portion for causing a transfer of a medium S to the electrostatic transfer belt 11 of the electrostatic transferring apparatus 5. Designated by a reference number 17 is a sheet feeder cassette of the transfer medium conveying portion 16, in which a plurality of transfer media S are stored. Designated by reference numbers 18 and 19 are a sheet feeder roller (semicylindrical roller), and a pair of registration rollers, respectively.

Designated by a referential number 20 is a fixation station located in the top portion of the apparatus main assembly 100. It fixes to the transfer medium S a plurality of toner images different in color having been transferred onto the transfer medium S. It has a rotational heat roller 21a, a pressure roller 21b kept pressured upon the heat roller 21a to apply pressure to the transfer medium S, etc. Designated by referential numbers 23 and 24 are a pair of discharge rollers, and a delivery tray portion which catches the transfer medium S on which an image has just been formed.

The photosensitive drums 1 in the first to fourth cartridges 7 are sequentially rotated in the counterclockwise direction indicated by an arrow mark with predetermined timings of the image formation sequence. Then, the scanner units 3(a–d) are sequentially driven in synchronism with the rotations of the photosensitive drums 1 of the corresponding cartridges 7. Further, the electrostatic transfer belt 11 of the electrostatic transferring apparatus 5 is circularly driven by a driver roller 13 in the clockwise direction indicated by an arrow mark at the peripheral velocity matching the peripheral velocities of the photosensitive drums 1.

As each photosensitive drum 1 is rotated as described above, its peripheral surface is uniformly charged (primary charge) by the charging apparatus 2(a–d) to predetermined polarity (negative in this embodiment) and potential level. The charged peripheral surface of the photosensitive drum 1 is exposed to the beam of laser light L outputted from the scanner unit 3 while being modulated with the image formation data. As a result, an electrostatic latent image in accordance with the image formation data is formed on the peripheral surface of the photosensitive drum 1.

The electrostatic latent image is developed (in reverse with use of toner, inherent polarity of which is negative, in this embodiment) into a toner image (image formed of toner) by the developing apparatus 4. As a result, toner images of magenta, cyan, yellow, and black colors are formed on the peripheral surfaces of the photosensitive drums 1 of the first to fourth cartridges 7(a–d), respectively, with predetermined sequence control timings.

Meanwhile, the feed roller 18 of the transfer medium conveying portion 16 is rotationally driven with the predetermined sequence control timing, feeding the transfer mediums S into the apparatus main assembly 100 from the cassette 17, while separating them one by one. As the leading end of each transfer medium S is conveyed, it comes into contact with the nip formed by the pair of registration rollers 19 which are not being rotated. As it comes into contact with the pair of registration rollers 19, it is temporarily kept on standby, arcing upward. Then, the registration rollers 19 begin to be rotationally driven in synchronism with the circular movement of the electrostatic transfer belt 11 and the movement of the line of the peripheral surface of the photosensitive drum 1, at which the toner image begins to be written. As a result, the transfer medium S is conveyed to the tension roller side of the upwardly moving side of the electrostatic transfer belt 11, and is electrostatically adhered to the surface of the electrostatic transfer belt 11 by the static electricity naturally induced in the electrostatic transfer belt 11, being thereby reliably held to the electrostatic transfer belt 11. Then, the transfer medium S is conveyed to the transfer station, or the most downstream station, by the movement of the electrostatic transfer belt 11. The transfer medium conveying portion 16 may be provided with a charging means, such as an electrostatic adhesion roller, or the like, for intentionally charging the transfer medium S and/or electrostatic transfer belt 11 in order to electrostatically adhere the recording medium S to the electrostatic transfer belt 11.

While being conveyed as described above, the transfer medium S sequentially receives in layers the toner images formed on the peripheral surfaces of the photosensitive drums 1; the toner images formed on the peripheral surfaces of the photosensitive drums 1 of the first to fourth cartridges 7 are sequentially transferred in layers onto the recording medium S by the electric field formed between the photosensitive drums 1 and corresponding transfer rollers 12. In this embodiment, bias with the positive polarity is applied to each transfer roller 12, causing thereby positive electric charge to be applied to the transfer medium S through the electrostatic transfer belt 11, generating the electric field, which transfers the toner images on the photosensitive drums 1, which are positive in polarity, onto the transfer medium S being conveyed in contact with the photosensitive drums 1(a–d), during the image transfer operation.

More specifically, the transfer medium S is electrostatically adhered to the surface of the electrostatic transfer belt 11, being held thereto, and is conveyed upward by the rotation of the electrostatic transfer belt 11. While the transfer medium S is conveyed upward by the electrostatic transfer belt 11 as described above, it sequentially receives in layers the toner images of magenta, cyan, yellow, and black colors formed on the peripheral surfaces of the photosensitive drums 1 of the first to fourth cartridges 7; it receives one toner image in each transfer station. As a result, an unfixed full-color toner image is synthesized on the surface of the recording medium S.

After the reception, in layers, of the four toner images different in color, the transfer medium S is separated from the electrostatic transfer belt 11 by the curvature of the driver roller 13 of the transfer medium conveying portion 16, and is conveyed into the fixation station 20. In the fixation station 20, the transfer medium S is conveyed through the fixation nip formed by the rotating heat roller 21a, and pressure roller 21b rotated while being pressed against the heat roller 21a. As a result, the plurality of toner images different in color are fixed to the transfer medium S by the heat and pressure applied to the transfer medium S by the pair of rollers 21a and 21b. After the fixation of the toner images to the transfer medium S in the fixation station 20, the transfer medium S is discharged by the pair of discharge rollers 23 into the external delivery tray 24 of the apparatus main assembly 100, with the image bearing surface of the transfer medium S facing downward.

The residues such as the toner remaining on the peripheral surface of the photosensitive drum 1 in each of the first to fourth cartridges 7 after the transfer of the toner image onto the transfer medium S are removed by the cleaning apparatus 6, and the photosensitive drum 1 is used for the following image formation.

(2) Process Cartridge 7

Figure 3:
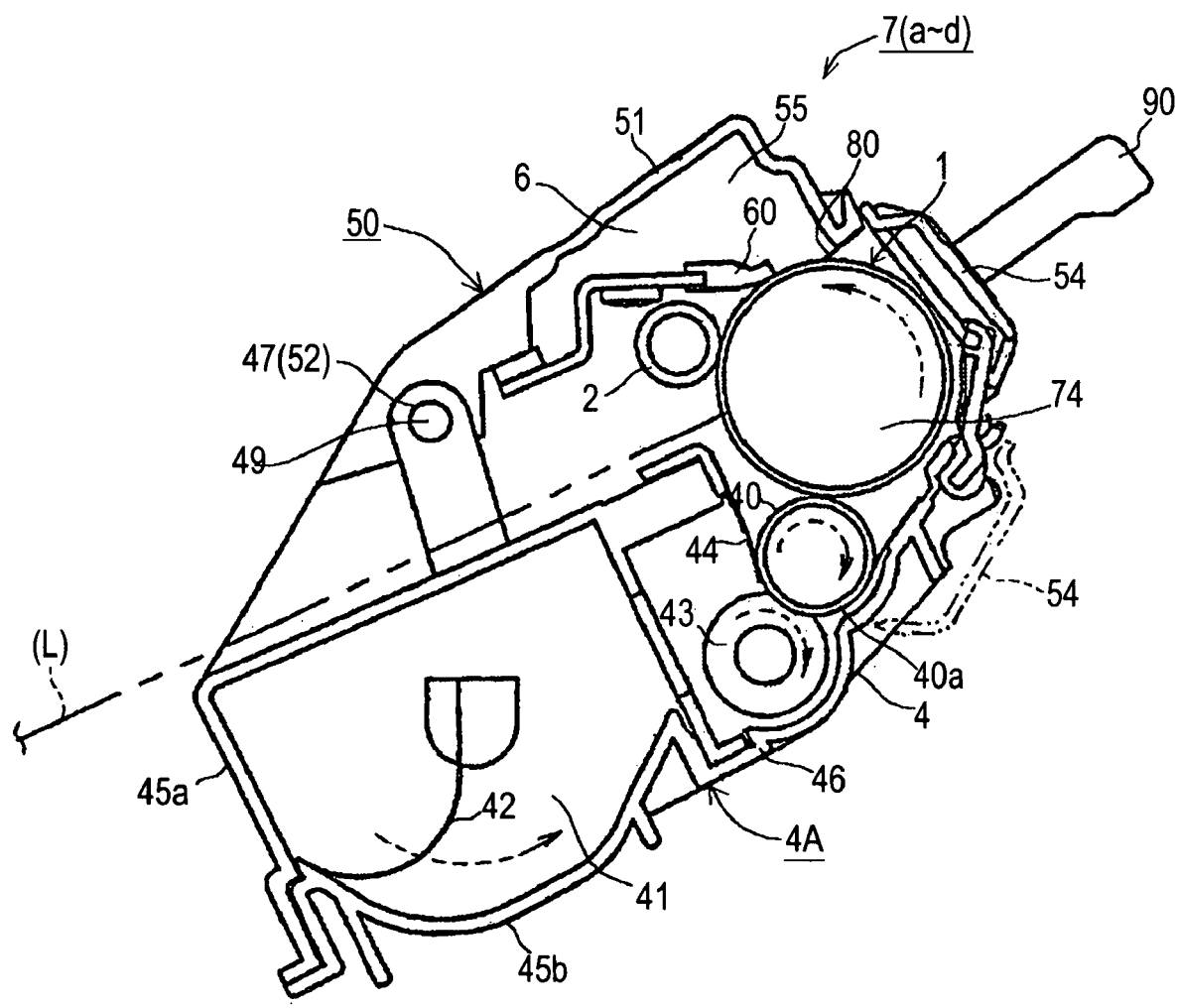
FIG. 3 is an enlarged cross-sectional view of the process cartridge in the preferred embodiment of the present invention.
Figure 4:
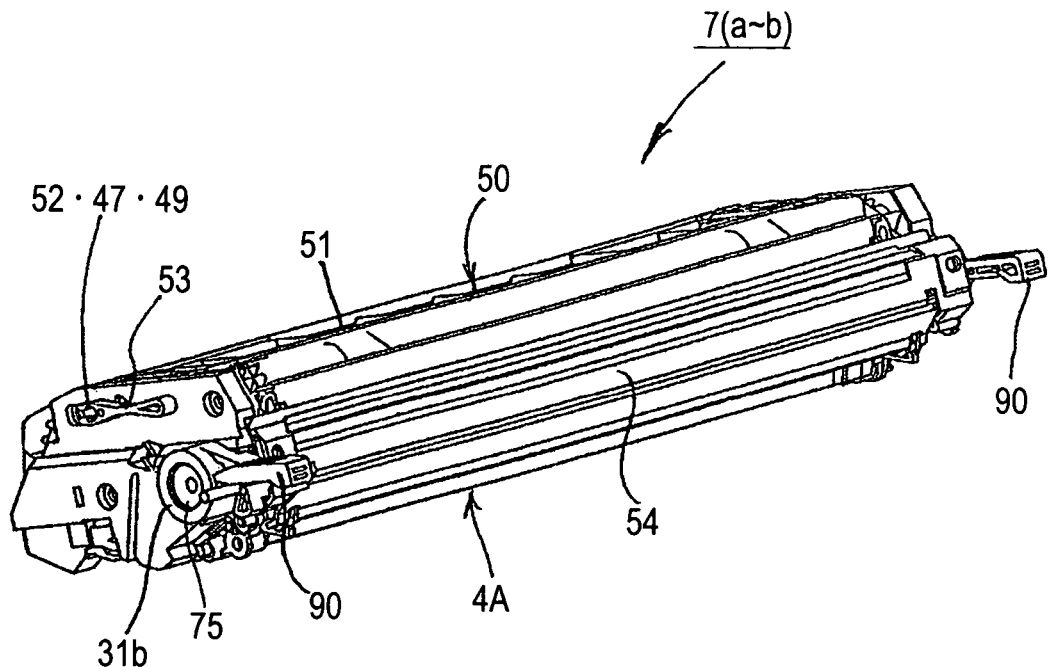
FIG. 4 is a perspective view of the process cartridge in the preferred embodiment of the present invention.
Figure 5:
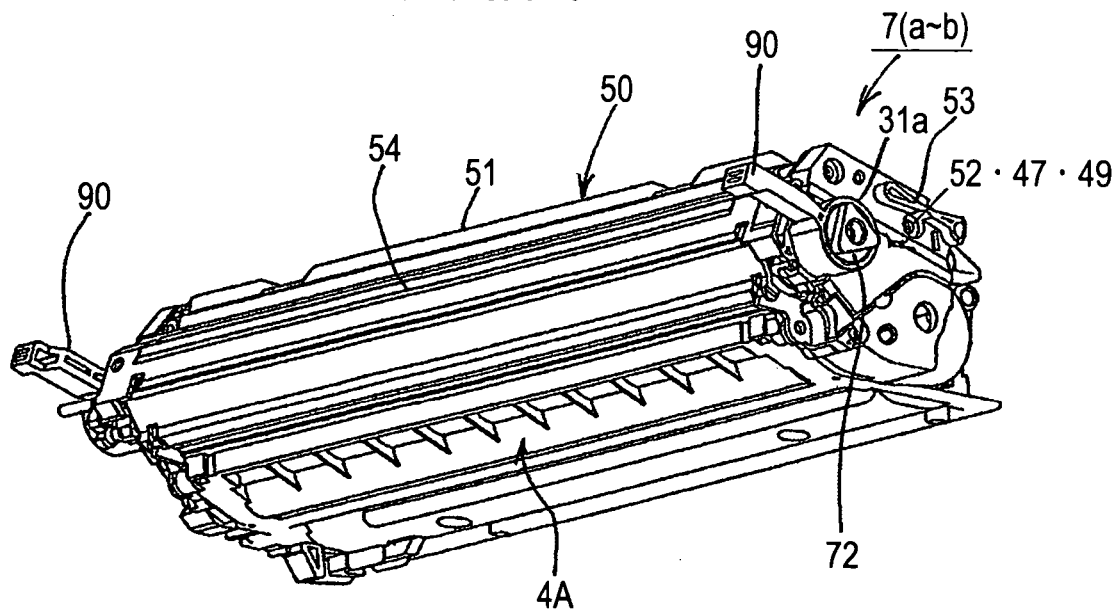
FIG. 5 is a perspective view of the process cartridge in the preferred embodiment of the present invention.

FIG. 3 is an enlarged cross sectional view of the cartridge 7, and FIGS. 4 and 5 are schematic perspective views of the cartridge 7.

In this embodiment, the photosensitive drum 1 is an integral part of the cartridge 7, and therefore, it is removably mounted into the apparatus main assembly 100 as the cartridge 7 is removably mounted into the apparatus main assembly 100.

In the following description of this embodiment, the widthwise direction of the cartridge 7 or the structural components thereof is the direction parallel to the direction in which the cartridge 7 is mounted into, or removed from, the apparatus main assembly 100, whereas the lengthwise direction means the direction intersectional (perpendicular) to the direction in which the cartridge 7 is mounted into, or removed from, the apparatus main assembly 100. The front side of the cartridge 7 means the side of the cartridge 7 which faces the direction from which the cartridge 7 is inserted into the apparatus main assembly 100, or the direction toward which the cartridge 7 is removed from the apparatus main assembly 100; in other words, it is the side of the cartridge 7 where the hole of the cartridge 7 through which the photosensitive drum 1 is exposed is present. The rear side of the cartridge 7 means the side opposite to the front side. The left and right of the cartridge 7 means the left and right sides, as seen from the front side of the cartridge 7. The top and bottom sides of the cartridge 7 means the sides which will be on the top and bottom sides, respectively, after the mounting of the cartridge 7 into the apparatus main assembly 100.

The first to fourth cartridges 7(a–d) are the same (in structure) except for the developers stored in the toner container portions (developer storage portions) of the developing apparatuses 4(a–d) of the first to fourth cartridges 7(a–d); the toner container portions of the first to fourth cartridges 7a, 7b, 7c, and 7d contain magenta toner, cyan toner, yellow toner, and black toner, respectively.

The cartridge 7 is made up of the cleaner unit 50 and development unit 4A. The cleaner unit 50 comprises the photosensitive drum 1, charging means 2, and cleaning means 6, whereas the development unit 4A comprises the developing means for developing an electrostatic latent image on the peripheral surface of the photosensitive drum 1.

The cleaner unit 50 also comprises a frame 51 to which the photosensitive drum 1, primary charging apparatus 2 for uniformly charging the photosensitive layer, or the outermost layer, of the photosensitive drum 1, cleaning blade 60 as the cleaning means 6 for removing the developer (residual toner) remaining on the peripheral surface of the photosensitive drum 1 after the image transfer, and a flexible sheet 80, etc., are attached.

The photosensitive drum 1 comprises an aluminum cylinder, and a photosensitive layer formed on the peripheral surface of the aluminum cylinder. It is provided with flanges 72 and 75, which are attached to the lengthwise ends of the photosensitive drum 1, one for one. The flanges 72 and 75 are rotatably supported by supporting members (bearings) 31a and 31b, with which the left and right walls of the cleaner unit frame 51 are provided. Of the two flanges 72 and 75, the flange 72 functions as a driving force transmitting member which couples with the rotational driving force transmitting member (unshown) of the apparatus main assembly 100, and receives the driving force from the driving force transmitting member (unshown) of the apparatus main assembly 100. The configurations of the driving force transmitting member of the apparatus main assembly 100 and the flange 72, and the manner of their connection, will be described in Section (4).

As the charging apparatus 2, a charging apparatus of a contact type may be used. The charging member is an electrically conductive roller, the peripheral surface of which is placed in contact with the peripheral surface of the photosensitive drum 1. The roller is rotated by the rotation of the photosensitive drum 1. The peripheral surface of the photosensitive drum 1 is uniformly charged by applying charge bias voltage to the roller while the roller is rotated by the rotation of the photosensitive drum 1.

The residual toner (waste toner) is removed from the peripheral surface of the photosensitive drum 1 by the cleaning blade 60, and the removed residual toner is stored in the waste toner chamber (residual toner storage chamber) 55 located above the cleaning blade 60. Incidentally, the toner remaining on the peripheral surface of the photosensitive drum 1 after the toner image transfer therefrom moves past the contact area between the flexible sheet 80 and the peripheral surface of the photosensitive drum 1, and reaches the cleaning blade 60. The flexible sheet 80 is attached to the cleaner unit frame 51 in order to prevent the residual toner from leaking out of the cleaner unit frame 51 after the residual toner is removed from the peripheral surface of the photosensitive drum 1 by the cleaning blade 60.

The development unit 4A comprises: a development sleeve 40, which is rotated (in the direction indicated by arrow mark in FIG. 3), with a minute gap maintained between the peripheral surfaces of the development sleeve 40 and photosensitive drum 1 by a pair of spacer rings 40a; and development means frames 45a and 45b, in which the toner is stored. The developing means frames 45a and 45b are joined by ultrasonic welding or the like means, forming the container unit 46. The development sleeve 40 is rotatably supported by the developing means container unit 46, with a pair of bearings placed between the development sleeve 40 and the unit 46. In the adjacencies of the peripheral surface of the development sleeve 40, a toner supply roller 43, which is rotated in the clockwise direction indicated by an arrow mark in contact with the peripheral surface of the development sleeve 40, and the development blade 44, are located. Further, in the toner container portion (developer storage portion) 41 of the developing means container unit 46, a toner conveyance mechanism 42 for conveying the toner (unshown) stored in the toner container portion 41, to the toner supply roller 43 while stirring it, is located.

The development unit 4A is provided with a pair of connective holes 47, which are located at the lengthwise ends of the container unit 46, one for one, whereas the cleaner unit frame 51 of the cleaner unit 50 is provided with a pair of supportive holes 52, which are located at the length ends of the cleaner unit frame 51. The development unit 4A and cleaner unit 50 are connected to each other by inserting a pair of pins 49 through the connective holes 47 and supportive holes 52 while holding the two units so that the connective holes 47 and supportive holes 52 align one for one. As a result, the entirety of the development unit 4A becomes rotatable about the pins 49, being thereby movable relative to the cleaner unit 50 while remaining suspended from the cleaner unit 50. Further, the development unit 4A is kept pressed by a pair of springs (unshown) in the direction to rotate the development unit 4A about the pins 49 so that the spacer rings 40a of the development sleeve 40 are kept in contact with the photosensitive drum 1 in the cleaner unit 50.

During a developing operation, the toner in the toner container 41 is conveyed by the stirring mechanism 42 to the toner supply roller 43, which is being rotated in the clockwise direction, in contact with the development sleeve 40 which is being rotated also in the clockwise direction. As a result, the peripheral surface of the supply roller 43 is rubbed against the peripheral surface of the development sleeve 40, causing the toner on the peripheral surface of the supply roller 43 to be transferred onto the peripheral surface of the development sleeve 40. The toner having been borne on the peripheral surface of the development sleeve 40 is brought by the rotation of the development sleeve 40 to the development blade (toner layer regulating member) 44. Thus, as the development sleeve 40 is further rotated, the layer of the toner on the peripheral surface of the development sleeve 40 is regulated in thickness by the development blade 44, into a thin layer of the toner uniform in thickness, while being given a predetermined amount of electric charge. Then, the thin layer of the toner on the peripheral surface of the development sleeve 40 is brought by the further rotation of the development sleeve 40 to the development station, in which the distance between the photosensitive drum 1 and development sleeve 40 is extremely small. In the development station, the toner from the thin layer of the toner on the peripheral surface of the development sleeve 40 is adhered to the electrostatic latent image on the peripheral surface of the photosensitive drum 1, by the development bias applied to the development sleeve 40 from the electrical power source (unshown); in other words, the latent image is developed. More specifically, the development sleeve 40 forms (develops) a toner image on the peripheral surface of the photosensitive drum 1 by transferring toner onto the numerous points of the electrostatic latent image, which are lower in potential level.

The toner which did not contribute to the development of the latent image, that is, the toner which remained on the development sleeve 40, is returned by the further rotation of the development sleeve 40, into the container unit 46, in which it is stripped from the development sleeve 40 by the supply roller 43, in the area in which the peripheral surfaces of the supply roller 43 and development sleeve 40 are rubbing against each other; in other words, the residual toner is recovered into the container unit 46. The recovered toner is mixed into the toner in the container unit 46 by the stirring mechanism 42.

Designated by a referential number 54 is a shutter for protecting the photosensitive drum 1. The shutter 54 is attached to the cleaner unit frame 51. It is movable by a shutter mechanism (unshown) between the closed position (FIGS. 3–5) in which it covers the photosensitive drum exposure window on the front side of the cartridge 7, and the open position (indicated by double dot chain line in FIG. 3) into which it is moved downward from the closed position to expose the photosensitive drum exposure window. When the cartridge 7 is out of the apparatus main assembly 100, the shutter 54 is kept in the closed position, protecting thereby the portion of the peripheral surface of the photosensitive drum 1, which will remain exposed if there were no the shutter 54. As the front cover 101 of the apparatus main assembly 100 is closed after the mounting of the cartridge 7 into the apparatus main assembly 100, the shutter 54 is moved into the open position by the shutter mechanism (unshown) which is moved by the movement of the front cover 101. As a result, the electrostatic transfer belt 11 is allowed to be placed in contact with the peripheral surface of the photosensitive drum 1 through the aforementioned exposure window of the cartridge 7 (FIG. 1).

Designated by a referential number 53 is a cartridge insertion guide of the cleaner unit frame 51. There are two cartridge insertion guides 53 located at the left and right lengthwise ends, one for one. Designated by a referential number 90 is a handle to be used when mounting the cartridge 7 into the apparatus main assembly 100 or removing it therefrom. There are two handles 90 which project frontward from the left and right lengthwise ends of the cartridge 7.

(3) Method for Mounting or Removing Cartridge 7

Figure 6:
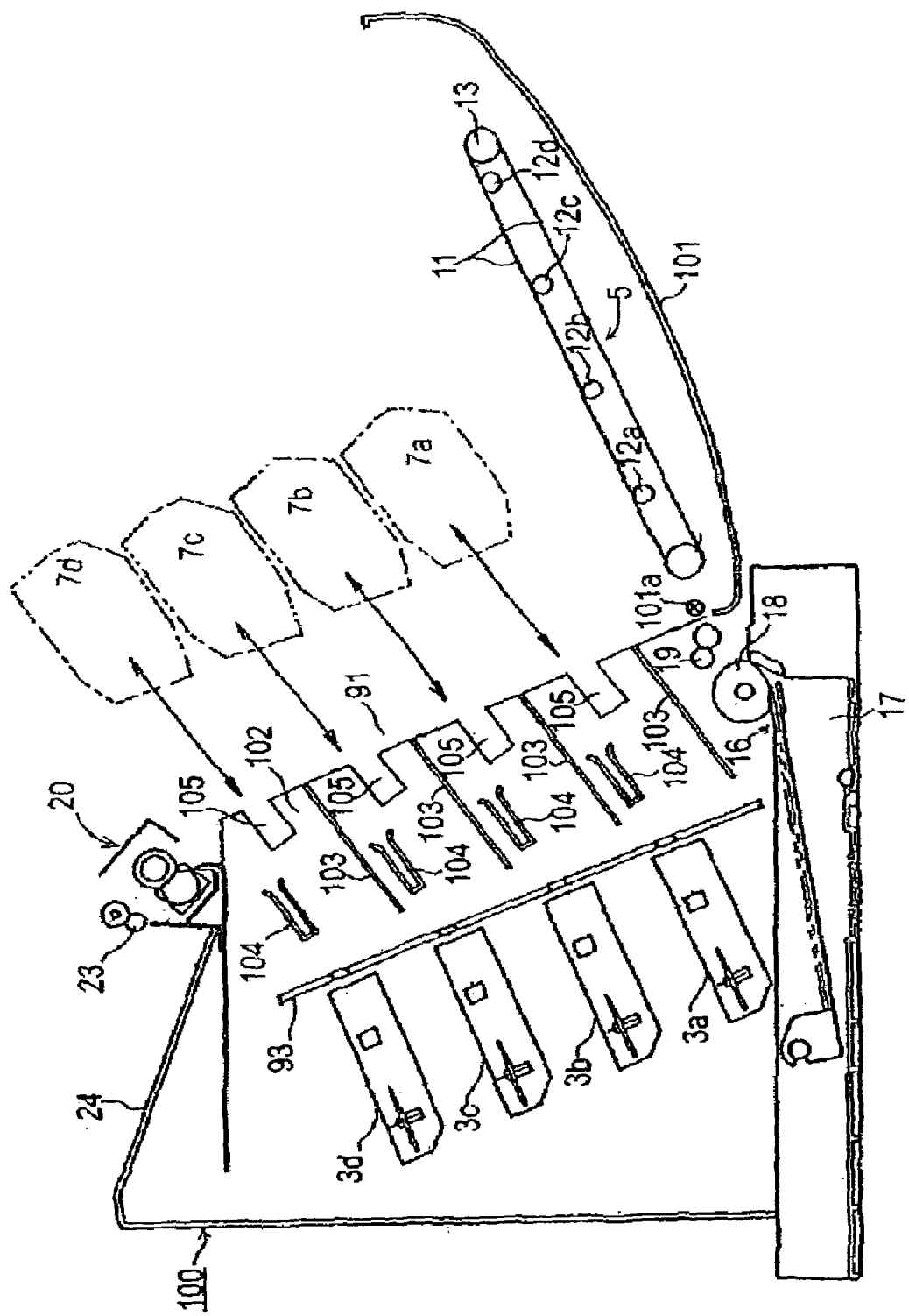
FIG. 6 is a schematic sectional view of the main assembly of the image forming apparatus in the preferred embodiment of the present invention, for describing how the process cartridges are mounted into the main assembly.

Next, the method for mounting the cartridge 7 into the apparatus main assembly 100 or dismounting it therefrom will be described. The operation for mounting the cartridges 7 into the apparatus main assembly 100 or removing them therefrom is to be carried out after opening the front cover 101 of the apparatus main assembly 100 to fully expose the cartridge insertion opening 91 of the apparatus main assembly 100 (FIGS. 2 and 6). When the front cover 101 is in the closed state (FIG. 1), it remains locked to the apparatus main assembly 100 by a latching mechanism (unshown). Thus, in order to mount or remove the cartridge 7, first, the front cover 101 must be unlocked from the apparatus main assembly 100 by unlatching the latching mechanism, so that the front cover 101 can rotated (opened), along with the electrostatic transferring apparatus 5 attached thereto, frontward of the apparatus main assembly 100, about the hinge shaft 101a located at the bottom of the front cover 101. As the front cover 101 is rotated (opened) all the way, the cartridge insertion opening 91 of the apparatus main assembly 100 becomes fully exposed.

Through the cartridge insertion opening 91, the first to fourth cartridges 7 are mountable into the cartridge compartment of the apparatus main assembly 100, in a manner to be stacked in parallel in the direction slightly tilted from the true vertical direction, in the listed order, that is, with the first cartridge mounted at the bottom. More specifically, the cartridge compartment is divided into four cartridge slots, which are the magenta, cyan, yellow, and black cartridge slots, listing from the bottom. The four cartridge slots are identical in cartridge mounting mechanism. Each cartridge slot is provided with a pair of rough guides 103, a pair of middle guides 104, and a pair of guiding grooves 105, for guiding the cartridge 7 into the image forming position. FIG. 6 shows the inward side of the right plate of the apparatus main assembly 100. The inward side of the left plate is symmetrical with that of the right plate.

An operator is to hold the cartridge 7 by the left and right handles 90, by grasping the handles 90 with both hands, and to insert the cartridge 7 into the proper cartridge slot through the cartridge insertion opening 91, so that the rear side of the cartridge 7, that is, the side opposite to the side where the photosensitive drum 1 is exposed, faces forward, and also, so that the left and right lengthwise end portions of the cartridge 7 will be rested on the left and right rough guides 103 of the apparatus main assembly 100, respectively. As the cartridge 7 is inserted deeper into the apparatus main assembly 100, the aforementioned pair of cartridge insertion guides 53 are moved onto the middle guides 104, causing thereby the cartridge 7 to be lifted from the rough guides 103. Thereafter, the cartridge 7 is guided by the middle guides 104.

As the cartridge 7 is inserted even deeper into the apparatus main assembly 100, the left and right supporting members 31a and 31b of the cartridge 7 are inserted into the left and right guiding grooves 105, respectively. Then, as the cartridge 7 is further inserted, the supporting members 31a and 31b come into contact with the deepest end of the guiding grooves 105, and prevent the further insertion of the cartridge 7 into the apparatus main assembly 100. As a result, the cartridge 7 is precisely positioned relative to the apparatus main assembly 100 in terms of the widthwise direction.

After the cartridges 7 are inserted into the proper cartridge slots as described above, the front cover 101, which was kept open, is to be closed, and to be locked to the apparatus main assembly 100 by latching the latching mechanism (unshown). The following are accomplished by the means (unshown) which is moved by the closing movement of the front cover 101:

1) Precise positioning of each cartridge 7 relative to the apparatus main assembly 100 in terms of the widthwise direction of each cartridge 7, and keeping the cartridge 7 pressured in the direction in which the cartridge 7 is inserted;
2) Moving the shutter 54 of each cartridge 7 into the open position; and
3) Starting the multiple pre-rotations of the image forming apparatus in order to couple the flange 72, on the driven side, of the photosensitive drum 1 of each cartridge 7 with the driving force transmitting member 73 on the main apparatus side.

The function of precisely positioning each cartridge 7 relative to the apparatus main assembly 100 in terms of the widthwise direction of the cartridge 7 is carried out by a pair of pressing members (unshown), which are moved by the movement of the front cover 101. When the front cover 101 is open, that is, when the front cover 101 is in the state in which the cartridges 7 can be mounted into, or removed from, the apparatus main assembly 100, the pressing members are in the positions into which they have been retracted from the guiding grooves 105. Thus, when the cartridge 7 is inserted, the pressing members do not interfere with the supporting members 31a and 31b of the cartridge 7. However, as the front cover 101 is closed after the insertion of the cartridges 7, the pressing members are moved into the positions in which they press the supporting members 31a and 31b against the deepest end of the guiding grooves 105, precisely positioning thereby the cartridge 7 relative to the apparatus main assembly 100 in terms of the widthwise direction.

With each cartridge 7 precisely positioned relative to the apparatus main assembly 100, the flange 72, on the driven side, of the cartridge 7, and the driving force transmitting rotational member 73 of the apparatus main assembly 100 become coupled with each other, making it possible for the diving force from the motor (unshown) of the apparatus main assembly 100 to be transmitted to the flange 72, on the driven side, of the cartridge 7, through the driving force transmitting rotational member 73; in other words, it becomes possible for the photosensitive drum 1 of each cartridge 7 to be rotationally driven. It should be noted here that the development sleeve 40, toner conveyance mechanism 42, and toner supply roller 43 are driven by the rotation of the photosensitive drum 1 through the gear train (unshown).

Also, electrical connection is established between the electrical contacts (unshown) on the cartridge side and the electrical contacts (unshown) on the main assembly side, making it possible for charge bias and development bias to be applied to the cartridge 7 from the power source (unshown) of the apparatus main assembly 100, and also, for information or the like to be exchanged between the memory element on the cartridge side and the control circuit on the apparatus main assembly side. The structure for grounding the photosensitive drum 1 will be described later in Section (4).

All that is necessary to remove the cartridge 7 from the apparatus main assembly 100 is to carry out in reverse the above described steps for mounting the cartridge into the apparatus main assembly 100. That is, first, the aforementioned latching mechanism is to be unlatched to unlock the front cover 101 from the apparatus main assembly 100. Then the front cover 101 is rotated downward about the hinge shaft 101a located at the bottom of the front cover 101 in order to open the front cover 101 frontward. As the front cover 101 is rotated downward, the cartridge pressing members are retracted by the means which moved by the opening movement of the front cover 101, being stopped from pressing the cartridge 7. Also as the front cover 101 is opened, the driving force transmitting rotational member 73 becomes disengaged from the flange 72 of the driven side, and the shutter 54 is moved into the open position. Then, an operator is to grasp the handles 90 of the cartridge 7 with both hands, and to pull the cartridge 7 in the direction opposite to the direction in which the cartridge 7 is pushed when it is mounted into the apparatus main assembly 100. This will remove the cartridge 7 from the apparatus main assembly 100.

(4) Method for Connecting Drum Grounding Plate 71)

Next, referring to FIGS. 7–10, the method for connecting the drum grounding plate 71 attached to the flange 72 on the driven side will be described in more detail.

Figure 7:
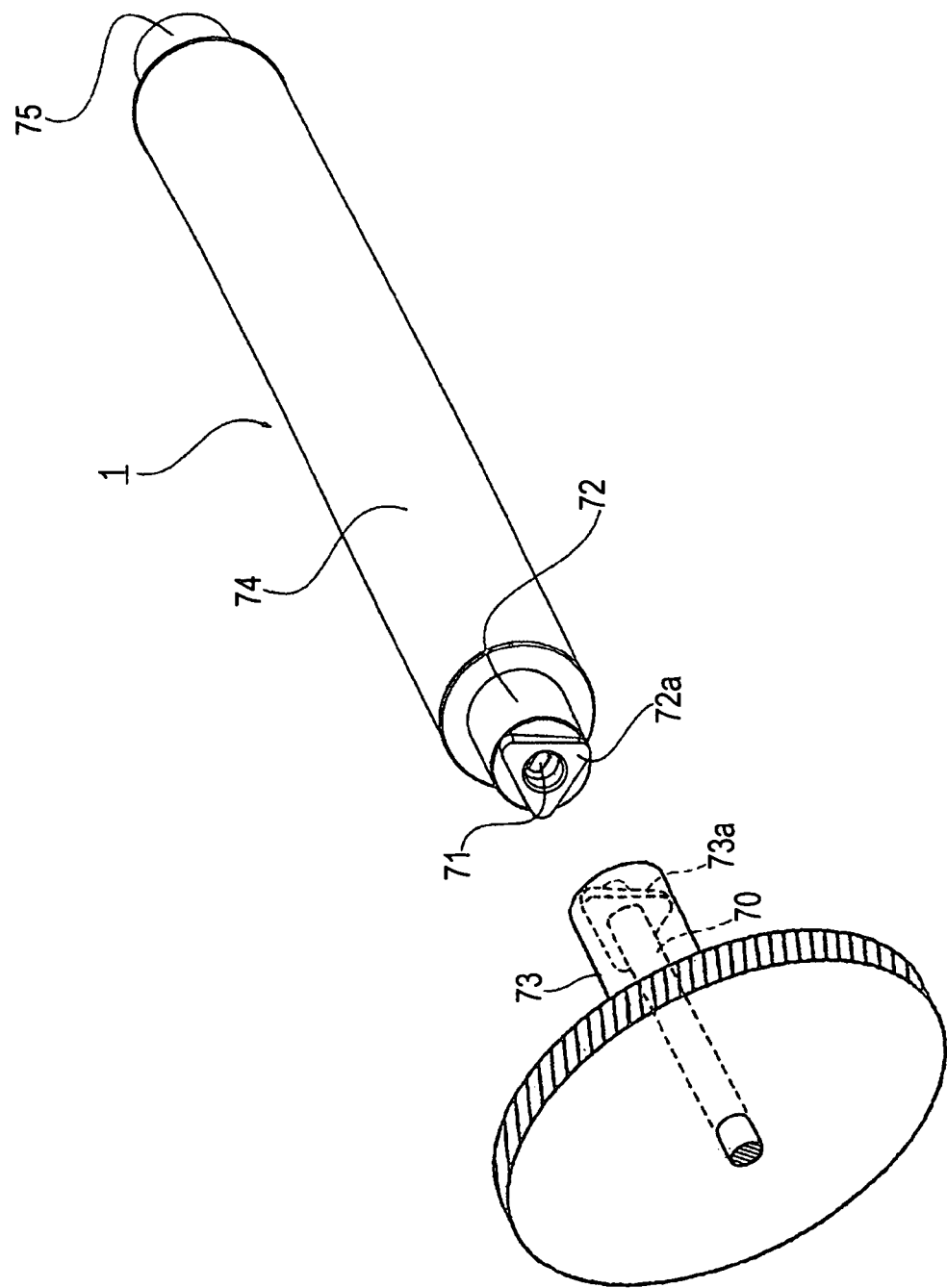
FIG. 7 is a perspective view of the photosensitive drum unit in the preferred embodiment of the present invention.
Figure 8:
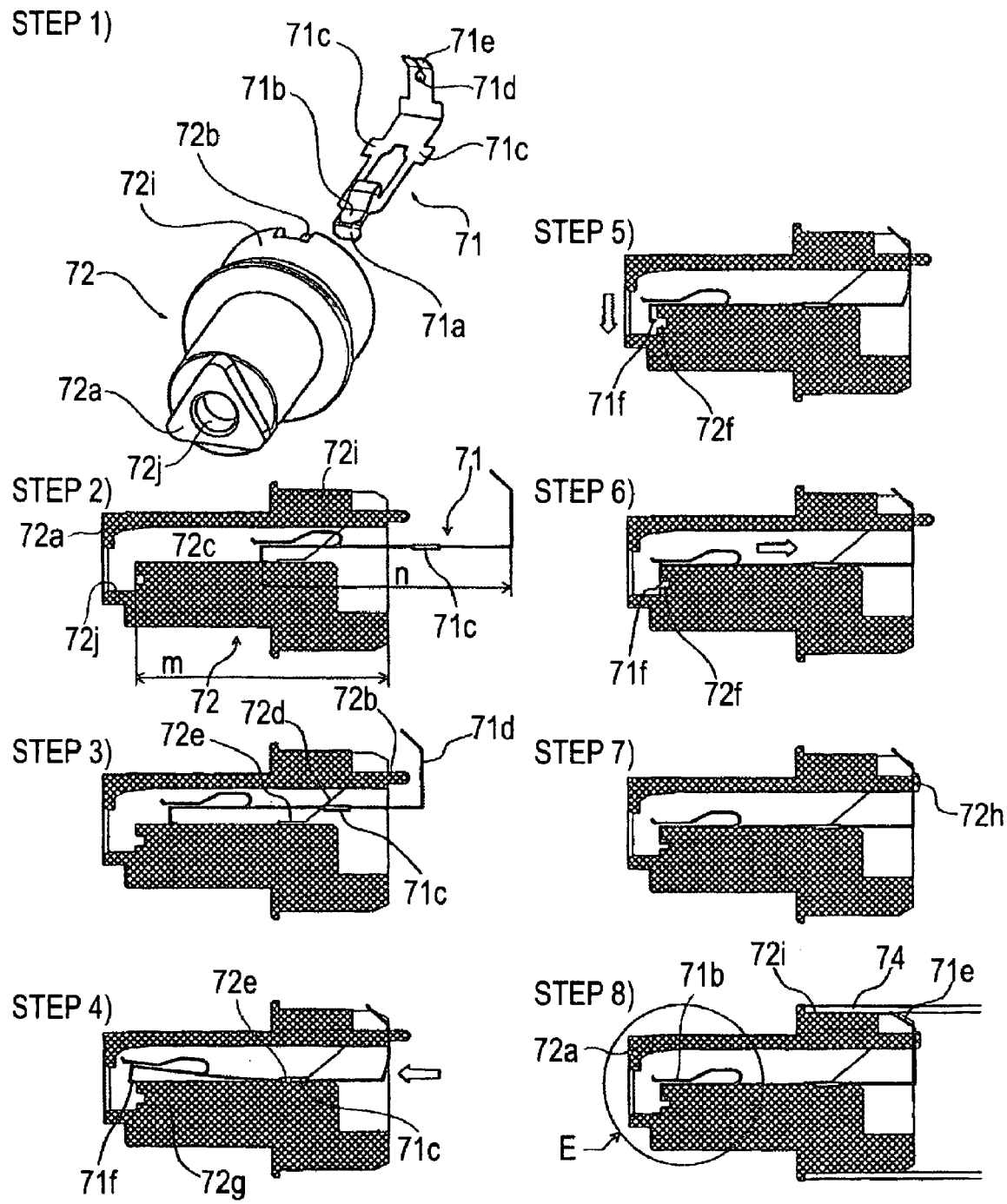
FIG. 8 is a combination of a perspective view and sectional views of the photosensitive drum unit, for describing the steps followed to attach the drum grounding plate.
Figure 9:
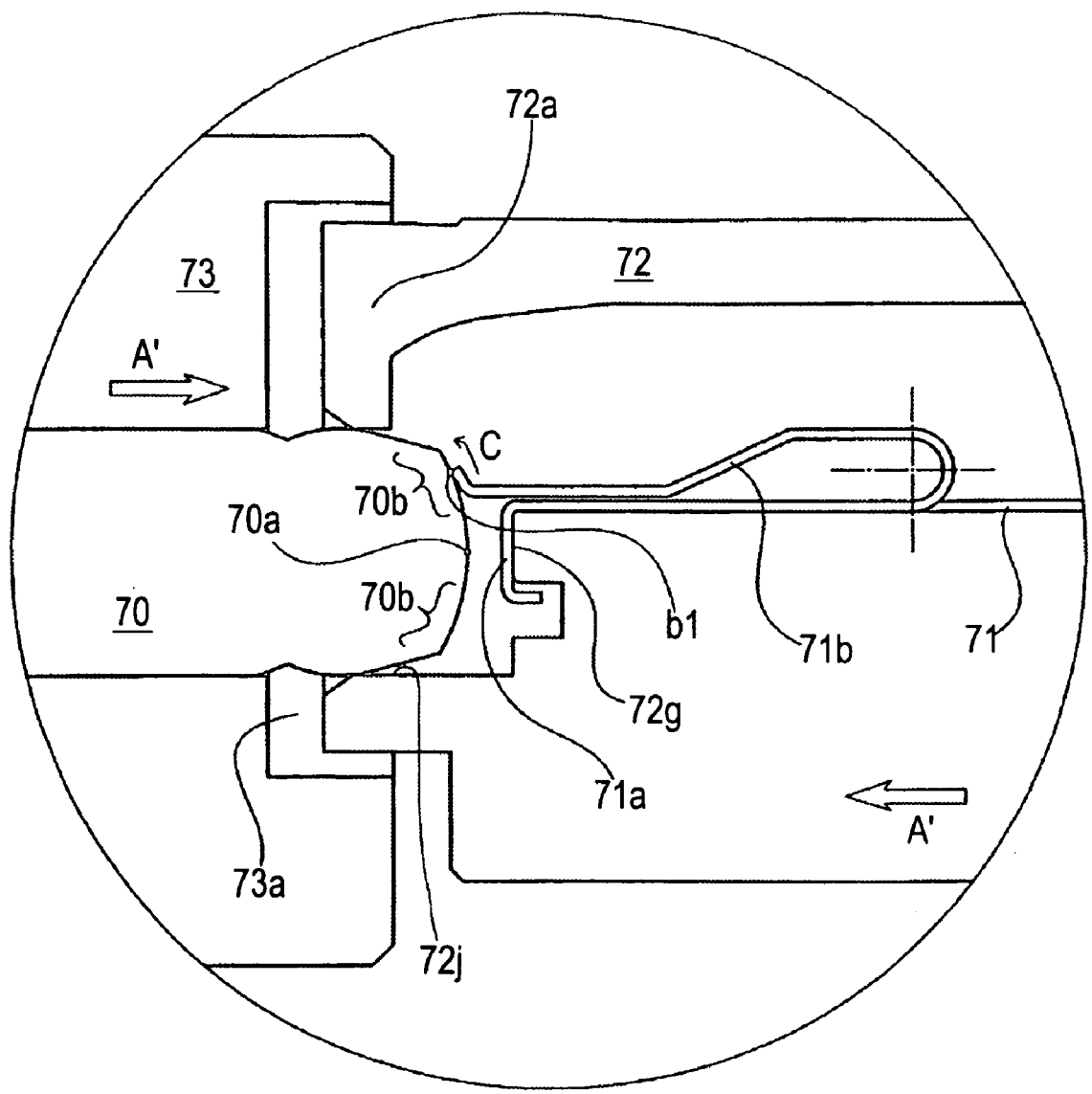
FIG. 9 is a detailed vertical sectional view of the drum grounding plate in the preferred embodiment of the present invention, describing the structure thereof.
Figure 10:
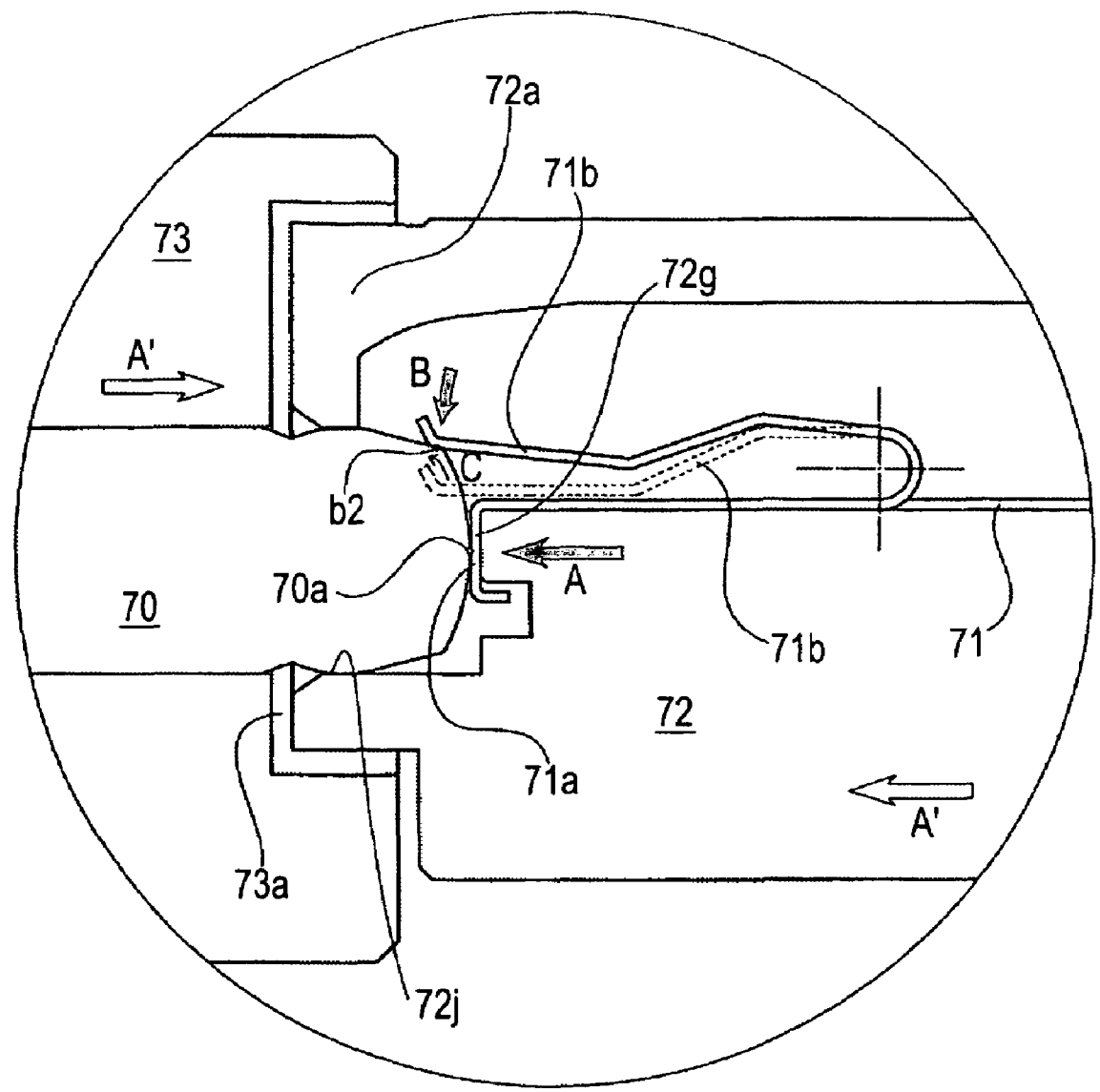
FIG. 10 is a detailed vertical sectional view of the drum grounding plate in the preferred embodiment of the present invention, describing the structure thereof.

FIG. 7 is a perspective view of the photosensitive drum (which hereinafter will be referred to as photosensitive drum unit) 1, and the driving force transmitting rotational member 73 on the apparatus main assembly side. FIG. 8 is a combination of a perspective view and vertical sectional views of the photosensitive drum unit 1, showing the steps followed to assemble the photosensitive drum unit 1. FIGS. 9 and 10 are enlarged views of the E portion in FIG. 8, showing the state of connection between the drum grounding plate 71 and drive shaft 70. FIG. 9 shows the positional relationship between the drum grounding plate 71 and drive shaft 70 at the moment the two have just come into contact with each other, or immediately before the two become separated from each other. FIG. 10 shows the positional relationship between the drum grounding plate 71 and drive shaft 70 when the cartridge 7 has been successfully mounted, being therefore ready for image formation.

First, referring to FIG. 7, the structure of the photosensitive drum unit 1 will be described.

The photosensitive drum unit 1 has a drum cylinder 74, which comprises, as described before, an aluminum cylinder and a layer of photosensitive substance coated on the peripheral surface of the aluminum cylinder. The photosensitive drum unit 1 also has a pair of flanges 72 and 75, which are pressed into the openings of the lengthwise ends of the drum cylinder 74, being virtually integrated with the drum cylinder 74. The flanges 72 and 75 are rotatably supported by the bearing members 31a and 31b (FIGS. 4 and 5) with which the cartridge 7 is provided. To the flange 72 located at one of the lengthwise ends of the photosensitive drum unit 1, the driving force is transmitted from the motor (unshown) within the apparatus main assembly 100 through the driving force transmitting rotational member 73, rotating thereby the photosensitive drum unit 1. In this embodiment, hereinafter, the flange 72 to which the driving force is transmitted from the apparatus main assembly 100 will be referred to as the driver flange 72, whereas the other flange will be referred to as the non-driver flange 75.

FIG. 9 is an enlarged view of the joint between the driver flange 72 and driving force transmitting rotational member 73. The driver flange 72 is provided with a spiral projection 72a (coupling projection) with a non-circular cross section; the cross section of the spiral projection has a plurality of apexes. The apparatus main assembly 100 is provided with the driving force transmitting rotational member 73 for transmitting the driving force from the motor (unshown) within the apparatus main assembly 100, to the photosensitive drum unit 1. The driving force transmitting rotational member 73 has a spiral hole 73a (coupling hole) with a non-circular cross section; the cross section of the spiral hole has a plurality of apexes. The axial line of the spiral hole 73a coincides with that of the driving force transmitting rotational member 73. As the cartridge 7 is mounted into the apparatus main assembly 100, the spiral projection 72a enters the spiral hole 73a, enabling the rotational driving force to be transmitted to the photosensitive drum unit 1. As the driving force transmitting rotational member 73 is rotated by the motor on the apparatus main assembly side, a force A' which acts in a direction to pull the spiral projection 72a into the spiral hole 73 is generated, causing the driving force transmitting rotational member 73 and the photosensitive drum unit 1 to be drawn toward each other.

The spiral projection 72a is provided with an electrically conductive second member 71 (which hereinafter will be referred to as a drum grounding plate) for establishing an electrical connection between the photosensitive drum unit 1 and apparatus main assembly 100. The drum grounding plate 71 is located at the center of the spiral projection 72a, in terms of the radius direction of the projection 72a, and is placed in contact with the internal surface of the drum cylinder 74. The driving force transmitting rotational member 73 is provided with an electrically conductive first member 70 (which hereinafter will be referred to as a drive shaft) for establishing our electrical connection between the photosensitive drum unit 1 and apparatus main assembly 100. The electrically conductive first member, or the drive shaft 70, projects a predetermined distance from the center of the bottom of the spiral hole 73a. The first and second electrically conductive members 70 and 71 allow the residual electric charge of the photosensitive drum unit 1 to escape to the apparatus main assembly 100.

Referring to FIG. 8, the drum grounding plate 71 is a single-piece member, and flat contact portion 71a, and a contact portion 71b in the form of an arm. The flat contact portion 71a, as one of the contacting means, is supported by the flat portion 72g provided within the driver flange 72. The arm-shaped contact portion 71b as the other contacting means is formed by bending or the like method. In terms of the lengthwise direction, the arm-like contact portion 71b extends outward beyond the flat contact portion 71a.

Referring to FIG. 9, the driver shaft 70, which is on the apparatus main assembly side, rotates with the driving force transmitting rotational member 73. The driver flange 72 is provided with a hole 72j into which the drive shaft 70 fits, and which is located roughly at the center of the driver flange 72 in terms of the radius direction. When the image forming apparatus is actually ready for image formation, the tip 70a of the drive shaft 70 is in contact with the flat contact portion 71a. The flat contact portion 71a is supported (backed) by the flat portion 72g provided within the driver flange 72. As the drive force transmitting rotational member 73 is rotated, with the spiral projection 72a being in the spiral hole 73a, the force A' which acts in the direction to pull the projection 72a into the hole 73a is generated. The contact pressure generated by the force A' applies to the tip 70a of the drive shaft 70 and the flat contact portion 71a. This concludes the coupling between the driving force transmitting rotational member 73 and driver flange 72 (photosensitive drum unit 1). The driving force transmitting rotational member 73 is provided with a spring (unshown) for keeping the connected photosensitive drum unit 1 pressured in the lengthwise direction. Thus, the non-driver flange 75 is kept pressured upon the cleaner unit 50 (cartridge 7) through the photosensitive drum unit 1. Therefore, the cleaner unit 50 is kept pressed upon-the side plate 102 of the apparatus main assembly 100. As a result, the cartridge 7 is precisely positioned-relative to the apparatus main assembly 100 in terms of the lengthwise direction.

Next, the process through which the drum grounding plate 71 becomes connected to its counterpart will be described in detail. Referring to FIG. 9 which shows the positional relationship between the drum grounding plate 71 and drive shaft 70 at the moment the two have just come into contact with each other, or immediately before the two become separated from each other, prior to the insertion of the cartridge 7 into the apparatus main assembly 100, the driving force transmitting rotational member 73 of the apparatus main assembly 100 remains retracted, being thereby prevented from interfering with the insertion of the cartridge 7. As the cartridge 7 is mounted into the apparatus main assembly 100, and the front cover 101 of the apparatus main assembly 100 is closed (FIG. 2), the driving force transmitting rotational member 73 is moved, while being rotated, toward the driver flange 72 in the lengthwise direction. As a result, the cartridge 7 (driver flange 72) and the apparatus main assembly 100 (driving force transmitting rotational member 73) become partially connected; the spiral projection 72a partially enters the spiral hole 73a.

In this state, the pre-rotation step (in which the apparatus is driven for a predetermined length of time between when a print start signal is inputted and when an actual image forming operation starts) is carried out. During this pre-rotation step, a rotational driving force is inputted from the driving force transmitting rotational member 73 into the drive flange 72 integral with the photosensitive drum unit 1. There occurs sometimes that the spiral projection 72a fails to enter the spiral hole 73a (the driver flange 72 fails to mesh with the driving force transmitting rotational member 73)

because they fail to synchronize in rotational phase during the preceding step, that is, the closing of the front cover 101 of the apparatus main assembly 100. However, the driving force transmitting rotational member 73 is kept pressed upon the photosensitive drum unit 1 (driver flange 72) in the lengthwise direction, as described above. Therefore, the driver flange 72 and the driving force transmitting rotational member 73 are eventually made to synchronize in rotational phase, meshing therefore with each other, during this pre-rotation period.

As the rotational driving force is inputted, with the driving force transmitting rotational member 73 and the driver flange 73 partially meshed (the spiral projection 72a being partially placed in the spiral hole 73a), the force A', which acts in the direction to draw the driving force transmitting rotational member 73 and driver flange 72 (photosensitive drum unit 1) toward each other (draw spiral projection 72a into spiral hole 73a), is generated. As a result, the spiral projection 72a is drawn into the spiral hole 73a. Therefore, in the driver flange 72, the drive shaft 70 and drum grounding plate 71 are drawn toward each other, causing the tip of the arm-shaped contact portion 71b of the drum grounding plate 71 to come into contact with the tip of the drive shaft 70, at a point b1 (FIG. 9).

As the input of the rotational driving force is continued, the generation of the force A' also continues, causing the tip of the arm-shaped contact portion 71b of the drum grounding plate 71 to follow the surface of the tip 70b of the drive shaft 70 in the radius direction of the drive shaft 70 as indicated by a letter c. In other words, the contact point between the tip of the arm-shaped portion 71b of the drum grounding plate 71 and drive shaft 70 shifts as the spiral projection 72a is drawn into the spiral hole 73a. Since the drum grounding plate 71 is formed of an electrically conductive elastic substance, it elastically deforms. Therefore, the tip in the arm-shaped portion 71b of the drum grounding plate 71 slides on the surface of the tip 70b of the drive shaft 70, while applying a slight pressure upon the surface of the tip 70b of the drive shaft 70, while the spiral projection 72a is drawn into the spiral hole 73a.

In other words, as the input of the rotational driving force continues, the spiral projection 72a is drawn into the spiral hole 73a so that the drive shaft 70 and drum grounding plate 71 are drawn to each other. As a result, the tip 70a of the drive shaft 70 comes into contact with the flat portion 71a of the drum grounding plate 71 as shown in FIG. 10. In other words, at the same time as the cartridge 7 is precisely positioned relative to the apparatus main assembly 100, electrical connection is established between the apparatus main assembly 100 and present invention drum unit 1 by the contact pressure A, which is the combination of the force A' and the pressure generated by the resiliency of the springs (unshown). Until the tip 70a of the drive shaft 70, and the flat portion 71a of the drum grounding plate 71 come into contact with each other, the drive shaft 70 is continuously rotated relative to the drum grounding plate 71. Thus, during this period, the tip of the arm-shaped portion 71b keeps on sliding on the surface of the tip 70b of the drive shaft 70, not only in the lengthwise direction of the drive shaft 70, but also, in the radially outward direction of the drive shaft 70. In other words, the tip of the arm-shaped portion 71b of the drum grounding plate 71 slides on the surface of the tip of the shaft 70, from the contact point b1 (FIG. 9) to the contact point b2 (FIG. 10) as indicated by the referential letter c in FIGS. 9 and 10. Thereafter, the electrical connection between the apparatus main assembly 100 and photosensitive drum unit 1 is maintained at the contact point b2 between the tip of the arm-shaped portion 71b of the drum grounding plate 71, and the surface of the tip 70a of the shaft 70, by the contact pressure B generated by the arm-shaped portion 71b of the drum grounding plate 71.

With the employment of the above-described method for electrically connecting the drum grounding plate 71 to the drive shaft 70, the contact point between the photosensitive drum unit 1 and the drive shaft 70 does not shift (slide) in the lengthwise direction during the actual image forming operation. That is, while the driver flange 72 and the driving force transmitting rotational member 73 are rotating together, with the spiral projection 72a engaged in the spiral hole 73a, the drum grounding plate 71 (flat portion 71a and arm-shaped portion 71b) and the drive shaft 70 (tip 70a of drive shaft) rotate together while remaining in contact with each other. Therefore, the cartridge 7 is reliably grounded to the apparatus main assembly 100. The drive shaft 70, which rotates with the driving force transmitting rotational member 73, is connected to the power supplying member (unshown) of the apparatus main assembly 100. The portion of the drive shaft 70 (portion of the power supplying member), which rubs against the power supplying member is coated with electrically conductive grease to assure that the cartridge 7 is grounded to the apparatus main assembly 100. It should be noted here that the contact point between the photosensitive drum unit 1 and drive shaft 70, which a user can touch, is not coated with electrically conductive grease. With the provision of the above-described structural arrangement in this embodiment of the present invention in which the contact point between the apparatus main assembly 100 and the cartridge 7 does not shift in the lengthwise direction during a period in which an image is actually formed, the cartridge 7 remains better grounded than with the provision of the structural arrangement in accordance with the prior art. Further, while the driver flange 72 (drum grounding plate 71) and the drive shaft 70 rotate together, with the spiral projection 72a remaining in the spiral hole 73a, the wall of the hole 72j into which the drive shaft 70 fits, and drum grounding plate 71, are prevented from being worn by the friction between the two, minimizing therefore their frictional wear.

The contact pressure between the flat portion 71a of the drum grounding plate 71 and the tip 70a of the drive shaft 70 is generated by the force A' generated as the drive shaft 70 is rotated by the rotational driving force transmitted thereto. In other words, the contact pressure is generated only while the driving force is inputted. Therefore, the members pertinent to the electrical connection between the apparatus main assembly 100 and cartridge 7 are less likely to suffer from fatigue. In addition, at the beginning of the transmission of the driving force, the contact point between the tip 70a of the drive shaft 70 and the flat portion 71a of the drum grounding plate 71 slightly shifts, creating the wiping effect.

As for the grounding of the photosensitive drum unit 1 through the arm-shaped portion 71b, or the other contact point, of the drum grounding plate 71, as the spiral projection 72a is drawn into the spiral hole 73a, the tip of the arm-shaped portion 71b slides on the surface of the tip 70b of the drive shaft 70 while being kept in contact with the surface by its own resiliency. In other words, it wipes itself while wiping the surface of the tip 70b of the shaft 70, better grounding therefore the photosensitive drum unit 1.

The configuration of the tip (inclusive of points 70a and 70b) of the drive shaft 70 does not need to be limited to the one in this embodiment. It has only to be such that allows the tip of the arm-shaped portion 71b of the drum grounding member 71 to be slid on the surface of the tip (inclusive of points 70a and 70b) of the shaft 70 as the spiral projection 72a is drawn into the spiral hole 73a.

Referring to FIGS. 9 and 10, in this embodiment, the arm-shaped portion 71b of the drum grounding plate 71 is shaped so that while its tip slides on the surface of the tip 70a of the drive shaft 70, the angle of the surface of the tip of the arm-shaped portion 71b relative to the line tangential to the surface of the tip 70b of the drive shaft 70 remains as small as possible, making it easier for the tip of the arm-shaped portion 71a to slide on the surface of the tip 70a of the drive shaft 70. Obviously, as long as the arm-shaped portion 71b is shaped so that as the spiral projection 72a is drawn into the spiral hole 73a, the tip of the arm-shape portion 71b is allowed to slide on (move in contact with) the surface of the tip 70a of the drive shaft 70, the same wiping effect as that realized by this embodiment can be realized. In other words, the arm-shaped portion 71b of the drum grounding plate 71 may be differently bent from the shape in which it is bent in this embodiment.

Further, in this embodiment, the arm-shaped portion 71b and flat portion plate 71b of the drum grounding plate 71 are formed by cutting and bending a single piece of an electrically conductive springy plate. However, the same effects as those described above can be obtained even if two or more electrically conductive members are combined to form the drum grounding plate 71 having the flat and arm-shaped portions 71a and 71b. Further, even if the spiral hole 73a with a non-circular cross section and spiral projection 72a with a non-circular cross section are switched in position, the same effects as those obtained by this embodiment can be obtained. In other words, even if the driver flange 72 is provided with a non-circular spiral hole 73a which has a cross section having a plurality of apexes, and the rotational axis of which coincides with that of the flange 72, and the driving force transmitting rotational member 73 of the apparatus main assembly 100 is provided with a spiral projection (72a) which has a cross section having a plurality of apexes, and the rotational axis of which coincides with that of the driving force transmitting rotational member 73, the same effects as those obtained by this embodiment can be obtained.

Further, the drive shaft 70 and drum grounding plate 71 may be switched in position. In other words, even if the drum grounding plate 71 is positioned at the center of the spiral hole 73a with a non-circular cross section, and the spiral projection 72a with a non-circular cross section is provided with the drive shaft 70, the rotational axis of which coincides with that of the spiral projection 72a, the same effects as those obtained by this embodiment can be obtained. However, placing the drum grounding plate 71 at the center of the spiral projection 72a with a non-circular cross section makes the hole 72j of the spiral projection 72a, through which the drive shaft 70 is put to be connected to the drum grounding plate 71, identical in diameter as the drive shaft 70, and therefore, making it possible to reduce the spiral hole 73a in cross section. Therefore, placing the drum grounding plate 71 at the center of the spiral projection 72a is superior for the purpose of preventing foreign objects from coming into contact with the springy drum grounding plate 71 from outside.

(5) Attachment of Drum Grounding Plate 71

Next, referring to FIG. 8, the steps to be followed in order to attach the drum grounding plate 71 to the driver flange 72 will be described in detail.

FIG. 8 is a combination of a perspective view and vertical sectional views of the driver flange 72 and drum grounding plate 71, showing the steps to be followed to attach the drum grounding plate 71.

The drum grounding plate 71 is attached to the driver flange 72 following steps 1)–8) in the numerical order. FIG. 8 (step 1) shows the drum grounding plate 71 and driver flange 72 prior to the attachment of the drum grounding plate 71 to the driver flange 72.

The drum grounding plate 71 in this embodiment is bent roughly in the shape of a letter L. In the sectional view of the drum grounding plate 71, at a plane perpendicular to the vertical portion of the letter "L" (direction perpendicular to lengthwise direction described before), the drum grounding plate 71 has a pair of projections 71c (by which drum grounding plate 71 is guided), which perpendicularly project from the longest edges of the drum grounding plate 71, one for one. The drum grounding plate 71 also has: a positioning hole 71d for precisely positioning the drum grounding plate 71 within the driver flange 72; a projection 71e by which the drum grounding plate 71 is placed in contact with the internal surface of the drum cylinder to establish electrical connection between the drum grounding plate 71 and the drum cylinder 74; and aforementioned flat and arm-shaped portion 71a and 71b.

The driver flange 72 is provided with a positioning pin 72b which fits into the positioning hole 71d of the drum grounding plate 71, and the spiral projection 72a (coupling portion) with a non-circular cross section, which has a plurality of apexes and projects from the end of the driver flange 72. Referring to FIG. 8 (step 2), the driver flange 72 is provided with an internal space 72c into which the drum grounding plate 71 is inserted. When attaching the drum grounding plate 71 to the driver flange 72, the drum grounding plate 71 is to be inserted, from its contact point side, into the driver flange 72 from the rear end of the driver flange 72 toward the front end, provided that the portion of the driver flange 72, which has the coupling portion, is the front end portion.

As the drum grounding plate 71 is inserted further into the driver flange 72 as shown in FIG. 8 (step 3), the pair of projections 71c, which perpendicularly project from the longest edges of the drum grounding plate 71, come into contact with a pair guide portions 72d of the driver flange 72, which are located within the internal space 72c. Each guide portion 72d is tilted backward in terms of the direction in which the drum grounding plate 71 is inserted into the drum grounding plate 71; in other words, the bottom end of the guide portion 72d is located more inward of the internal space 72c than the top end of the guide portion 72d. Therefore, as the drum grounding plate 71 is further inserted, it is guided downward in the drawing by the pair of guiding portions 72d. As a result, the tip portion of the drum grounding plate 71, which essentially is the contact point, is elastically deformed into the space 72c, and the positioning pin 72b of the driver flange 72, which projects from the rear surface of the driver flange 72 fits into the positioning hole 71d of the drum grounding plate 71.

The bottom end of each of the slanted guide portion 72d is connected to the slit (groove) 72e, the dimension of which in terms of the vertical direction in FIG. 8 is equal to the thickness of the drum grounding plate 71. Thus, as the drum grounding plate 71 is further insert after its contact with the pair of guiding portions 72d in FIG. 8 (step 4), the pair of projections 71c of the drum grounding plate 71 slide into the pair of slits (grooves) 72e, one for one. Even after the sliding of the pair of projections 71c of the drum grounding plate 71 into the pair of slits (grooves) 72e, the tip portion of the drum grounding plate 71 is kept within the space 72c by the resiliency of the drum grounding plate 71.

The leading end portion of the drum grounding plate 71, in terms of the plate insertion direction, is provided with a catch portion 71f formed by bending the very tip of the leading end portion of the drum grounding plate 71. Thus, as the drum grounding plate 71 is further inserted into the driver flange 72 while elastically bending the trailing end portion of the drum grounding plate 71 in the direction indicated by an arrow mark in FIG. 8 (step 4), the catch portion 71f is moved beyond the flat end portion 72g of the driver flange 72, and is moved downward, in the drawing, sliding on the flat end portion 72g, by the resiliency of the drum grounding plate 71 itself. In other words, the tip of the drum grounding plate 71 is moved downward in the space 72c, as shown in FIG. 8 (step 5).

Further, the driver flange 72 is provided with a recess 72f into which the catch portion 71f of the drum grounding plate 71 latches. As the pressure applied to the rear end of the drum grounding plate 71 is removed, the resiliency of the drum grounding plate 71 generates such force that acts in the direction to move the tip of the drum grounding plate 71 in the direction indicated by an arrow mark in FIG. 8 (step 6). As a result, the back side of the flat portion 71a of the drum grounding plate 71 is placed flatly in contact with the flat portion 72g of the driver flange 72. It should be noted here that the dimension m (distance between the rear end and flat end portion 72g of the driver flange 72) and dimension n (distance between the rear end and flat portion 71a of the drum ground plate 71) are set so that even if the combination of the tolerances of the drum grounding plate 71 and river flange 72 is substantial, the equation n=m is satisfied, ensuring that the flat portion 71a of the drum grounding plate 71 is placed flatly in contact with the flat end portion 72g of the driver flange 72.

The catch portion 71f located at the very tip of the drum grounding plate 71 latches into the recess 72f of the driver flange 72, preventing thereby the drum grounding plate 71 from floating upward, since the catch portion 71f is formed by bending rearward the very tip of the drum grounding plate 71. Therefore, it entirely fits into the recess 72f of the driver flange 72, and therefore, does not interfere with the electrical connection between the drum grounding plate 71 and drive shaft 70.

In the step 7), the positioning pin 72b is thermally deformed to form a retainer portion 72h in order to prevent the drum grounding plate 71 from moving relative to the driver flange 72.

The above described steps 1)–7) ensure that the drum grounding plate 71 is precisely positioned in the driver flange 72. In particular, they ensure that the aforementioned two contact points between the drive shaft 70 and drum grounding plate 71 remain stable in position.

In the step 8), or the last step, the rear end portion 72i of the driver flange 72 is pressed into the drum cylinder 74. During this step, the projection 71e of the drum grounding plate 71 slides on the internal surface of the drum cylinder 74. After the rear portion 72i of the drum grounding plate 71 is pressed into the drum cylinder 74, the projection 71e is kept pressed upon the internal surface of the drum cylinder 74 by the resiliency of the drum grounding plate 71, ensuring the electrical connection between the drum grounding plate 71 and drum cylinder 74.

The above described steps for assembling the photosensitive drum unit 1 makes it possible to work on the driver flange 72, from one end of the driver flange 72, that is, the drum grounding plate 71 can be simply inserted into the driver flange 72, from the rear end of the driver flange 72, improving the efficiency with which the photosensitive drum unit 1 is assembled. Further, since the drum grounding plate 71 is formed as a single-piece component, and the interior of the driver flange 72 is structured as described above, not only is it ensured that the photosensitive drum unit 1 is properly grounded, but also, the photosensitive drum unit 1 is improved in assembly efficiency. In other words, according to this embodiment of the present invention, the drum unit 1 can be reliably grounded to the apparatus main assembly 100 with the use of the simpler structural arrangement, improving thereby the image forming apparatus in cost performance.

As described above, in this embodiment:

1) The photosensitive drum unit 1 is grounded through the electrical connection between the drive shaft 70 (first conductive member) on the main assembly side of the image forming apparatus, and the drum grounding plate 71 (second conductive member) placed within the drum cylinder 74 of the photosensitive drum unit 1. In the case of this structural arrangement, the drum grounding plate 71 is provided with the flat contact portion 71a and arm-shaped contact portion 71b, and as the rotational driving force is transmitted to the spiral projection 72a having entered the spiral hole 73a, the force A' which draws the spiral projection 72a into the spiral I hole 73a (driving force transmitting rotational member 73) is generated, causing the photosensitive drum unit 1 to be moved toward the driving force transmitting rotational member 73. Then, as the photosensitive drum unit.1 is moved toward the driving force transmitting rotational member 73, the flat contact portion 71a of the drum grounding plate 71 comes into contact with the tip of the drive shaft 70, and the tip of the arm-shaped portion 71b slides on the surface of the tip 70a of the drive shaft 70. In other words, the structural arrangement in this embodiment provides two means for electrically connecting the photosensitive drum unit 1 and apparatus main assembly 100, making it possible to better grounding the photosensitive drum unit 1.

Further, the contact point of the photosensitive drum unit 1 and the contact point of the drive shaft 70 are prevented from keeping on rubbing each other after they are connected, making it possible for the cartridge 7 to be more reliably grounded to the apparatus main assembly 100. Further, the drive flange 72 (drum grounding plate 71) is solidly located with the drive shaft 70. Therefore, the wall of the hole 72j of the driver flange 72, into which the drive shaft 70 fits, and the drum grounding plate 71, are presented from being frictionally worn.

As for the first means for electrically connecting the photosensitive drum unit 1 to the apparatus main assembly 100, the flat contact portion 71a of the drum grounding plate 71 is placed, and kept, in contact with the tip 70a of the drive shaft 70 by the contact pressure, or the force A' generated in the direction to draw the spiral projection 72a of the driver flange 72 into the spiral hole 73a of the driving force transmitting rotational member 73 as the rotational driving force is transmitted to the spiral projection 72a placed in the spiral hole 73a. Therefore, the contact pressure applies only while the driving force is inputted, preventing the components pertinent to the electrical connection between the photosensitive drum unit 1 and apparatus main assembly 100 from being fatigued by the contact pressure. Further, the point of contact between the contact points on the photosensitive drum unit side and the contact point on the apparatus main assembly side are structured so that they slightly shift in position, and once the connection is fully established, they do not shift in position while the driving force is transmitted. Therefore, the tip 70a of the drive shaft 70 and the flat contact portion 71a of the drum grounding plate 71 wipe each other at the beginning of the transmission of the driving force, and yet, the components pertinent to the electrical connection between the photosensitive drum unit 1 and apparatus main assembly 100 are not frictionally worn during the rest of the transmission of the driving force.

As for the second means for electrically connecting the photosensitive drum unit 1 to the apparatus main assembly 100, the arm-shaped portion 71b of the drum grounding plate 71 slides on the surface of the tip 70b of the drive-shaft 70, while being kept pressured upon the surface of the end portion 70b of the drive shaft 70 by the resiliency of the drum grounding plate 71. Therefore, the point of contact between the arm-shaped portion 71b and tip 70b shifts in position only at the beginning and end of the transmission of the driving force; it does not shift in position during the rest of the driving force transmission. Therefore, the arm-shaped portion 71b and the tip 70b of the drive shaft 70 wipe each other as they become fully connected, ensuring the electrical connection between the photosensitive drum unit 1 and apparatus main assembly 100.

2) The drum grounding plate 71 having the flat contact portion 71a and the arm-shaped contact portion 71b is formed as a single-piece component, reducing thereby the component count.

3) As the means for accurately attaching the drum grounding plate 71 to the driver flange 72, the driver flange 72 is provided with the pair of guide portions 72d for guiding the drum grounding plate 71 to the predetermined position in the internal space 72c, whereas the drum grounding plate 71 is provided with the pair of projections 71c by which the drum grounding plate 71 is guided by the pair of guide portions 72d. Therefore, the drum grounding plate 71 can be attached to the driver flange 72 by simply pushing the drum grounding plate 71 into the driver flange 72 from the rear end of the driver flange 72, improving the photosensitive drum unit 1 in assembly efficiency.

4) For the purpose of preventing the drum grounding plate 71 from moving after its attachment to the driver flange 72, the drum grounding plate 71 is provided with the catch portion 71f bent toward the rear of the drum grounding plate 71, whereas the driver flange 72 is provided with the recess 71f into which the catch portion 71f latches. In addition, the drum grounding plate 71 is shaped so that as the drum grounding plate 71 is attached to the driver flange 72, the catch portion 71f latches into the recess 72f and remains latched therein, by the resiliency of the drum grounding plate 71 itself. Therefore, the actual contact portion, or the tip, of the drum grounding plate 71 is prevented from floating (becoming separated) from the driver flange 72. Therefore, it is assured that the point of contact is precisely position. Consequently, the photosensitive drum unit 1 is better grounded.

5) The photosensitive drum unit 1 having the above described drum grounding features 1)–4) may be structured so that it can be directly mounted into, or removed from, the apparatus main assembly 1000, without being placed in the process cartridge. Such an arrangement also produces the same effects as those described above.

[Miscellanies]

1) As for the developing method, one of the widely known developing methods, for example, two component magnetic brush based developing method, cascade developing method, touch-down developing method, cloud developing method, etc., may be employed, instead of the developing method employed in the above described embodiment.

2) In the above described embodiment, the so-called contact type charging method is employed as the charging means. Obviously, the charging method does not need to be limited to the above described one. For example, one of the charging methods, which has been widely used in the past, may be employed. Namely, a piece of tungsten wire is surrounded on three sides by a shield formed of metallic substance such as aluminum, so that the positive or negative ions generated by applying high voltage to the tungsten wire can be transferred onto the peripheral surface of the photosensitive drum in order to uniformly charge the peripheral surface of the photosensitive drum.

As for the charging means, a blade (charge blade), a pad, a block, a rod, a wire, or the like, may be employed in stead of the aforementioned roller.

3) As for the method for removing the toner remaining on the photosensitive drum, a cleaning means in the form of a blade, a fur brush, a magnetic brush, or the like, may be employed instead of the above described one.

According to the present invention, it is possible to provide an electrophotographic photosensitive drum capable of reliably establishing electrical connection between it and the main assembly of an electrophotographic image forming apparatus, a process cartridge comprising said electrophotographic photosensitive drum, and an electrophotographic image forming apparatus compatible with said electrophotographic photosensitive drum and process cartridge.

Also according to the present invention, it is possible to provide an electrophotographic photosensitive drum capable of wiping its electrically conductive member in order to be reliably grounded, a process cartridge comprising the electrophotographic photosensitive drum, and an electrophotographic image forming apparatus compatible with the electrophotographic photosensitive drum and process cartridge.

Also according to the present invention, it is possible to provide an electrophotographic photosensitive drum capable of rotating the first and second electrically conductive members together in order to prevent the conductive members from being frictionally worn, a process cartridge comprising the electrophotographic photosensitive drum, and an electrophotographic image forming apparatus compatible with the electrophotographic photosensitive drum and the process cartridge.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Application No. 099503/2004 filed Mar. 30, 2004, which is hereby incorporated by reference.

What is claimed is:

1. An electrophotographic photosensitive drum usable with an electrophotographic image forming apparatus, comprising:

a non-circular twisted projection having a cross-section with a plurality of corner portions, said non-circular twisted projection being provided at one longitudinal end of said electrophotographic photosensitive drum, and being engageable with a non-circular twisted hole having a cross-section with a plurality of corner portions, the non-circular twisted hole being disposed at a central portion of a driving rotatable member of a main assembly of the image forming apparatus; and a drum electroconductive member provided on said projection and being electrically connected with said electrophotographic photosensitive drum, said drum electroconductive member being contactable with a main-assembly electroconductive member electrically connected with the main assembly of the image forming apparatus, the main-assembly electroconductive member being disposed in the hole to ground said electrophotographic photosensitive drum, wherein a contact position between said drum electroconductive member and the main-assembly electroconductive member moves in interrelation with said projection being moved toward the hole by rotation of the driving rotatable member when said projection is engaged with the hole of the driving rotatable member, and wherein said drum electroconductive member has a projected hook, and a driving side flange member of said non-circular twisted projection has a recess configured to engage said hook, to prevent movement of said drum electroconductive member, and when said drum electroconductive member is mounted to said driving side flange member, said hook and said recess are urged toward engagement with each other.

2. An electrophotographic photosensitive drum usable with an electrophotographic image forming apparatus, comprising:

a non-circular twisted projection having a cross-section with a plurality of corner portions, said non-circular twisted projection being provided at one longitudinal end of said electrophotographic photosensitive drum, and being engageable with a non-circular twisted hole having a cross-section with a plurality of corner portions, the non-circular twisted hole being disposed at a central portion of a driving rotatable member of a main assembly of the image forming apparatus; and a drum electroconductive member provided on said projection and being electrically connected with said electrophotographic photosensitive drum, said drum electroconductive member being contactable with a main-assembly electroconductive member electrically connected with the main assembly of the image forming apparatus, the main-assembly electroconductive member being disposed in the hole to ground said electrophotographic photosensitive drum, wherein while said projection is in engagement with the hole and is being rotated, the main-assembly electroconductive member and said drum electroconductive member are integrally rotated while being in contact with each other, wherein said drum electroconductive member has a projected hook, and a driving side flange member of said non-circular twisted projection has a recess configured to engage said hook, to prevent movement of said drum electroconductive member, and when said drum electroconductive member is mounted to said driving side flange member, said hook and said recess are urged toward engagement with each other.

* * * * *

UNITED STATES PATENT AND TRADEMARK OFFICE
CERTIFICATE OF CORRECTION

PATENT NO. : 7,003,247 B2
APPLICATION NO. : 10/960117
DATED : February 21, 2006
INVENTOR(S) : Isao Koishi et al.

It is certified that error appears in the above-identified patent and that said Letters Patent is hereby corrected as shown below:

COLUMN 4:
Line 16, "provided a" should read --provided an--.
Line 59, "nected" should read --nected to--.

COLUMN 12:
Line 47, "can" should read --can be--.

COLUMN 16:
Line 13, "fits ," should read --fits,--.
Line 34, "upon-the" should read --upon the--.
Line 36, "positioned-relative" should read --positioned relative--.

COLUMN 20:
Line 63, "insert" should read --inserted--.

COLUMN 22:
Line 32, "unit. 1" should read --unit 1--.

COLUMN 24:
Line 23, "in stead" should read --instead--.

Signed and Sealed this

Tenth Day of July, 2007

JON W. DUDAS
*Director of the United States Patent and Trademark Office*